(12) United States Patent
Hallett et al.

(10) Patent No.: US 11,412,186 B2
(45) Date of Patent: Aug. 9, 2022

(54) ENHANCED VIDEO SYSTEM

(71) Applicant: INPIXON CANADA, INC., Coquitlam (CA)

(72) Inventors: James Francis Hallett, Vancouver (CA); Kirk Arnold Moir, New Westminster (CA)

(73) Assignee: INPIXON CANADA, INC.

( * ) Notice: Subject to any disclaimer, the term of this patent is extended or adjusted under 35 U.S.C. 154(b) by 64 days.

(21) Appl. No.: 16/777,584

(22) Filed: Jan. 30, 2020

(65) Prior Publication Data

US 2020/0169702 A1 May 28, 2020

Related U.S. Application Data

(63) Continuation of application No. 15/640,209, filed on Jun. 30, 2017, now Pat. No. 10,674,117, which is a
(Continued)

(51) Int. Cl.
*H04N 7/18* (2006.01)
*H04W 4/02* (2018.01)
(Continued)

(52) U.S. Cl.
CPC .......... *H04N 7/183* (2013.01); *G06Q 10/0631* (2013.01); *H04N 21/83* (2013.01); *H04W 4/023* (2013.01)

(58) Field of Classification Search
CPC ......... G06T 19/006; G06T 7/70; G06T 7/248; G06T 11/00; G06T 2207/10016; G06T 2207/30196; G06T 7/20; G06T 13/20; G06T 19/003; G06T 2200/04; G06T 2200/24; G06T 2207/10028; G06T 2207/30204; G06T 2215/16; G06T 3/20; G06T 3/40; G06T 7/0002; G06T 7/251;
(Continued)

(56) References Cited

U.S. PATENT DOCUMENTS 5,650,769 A 7/1997 Campana, Jr.
5,714,937 A 2/1998 Campana, Jr.
(Continued)

OTHER PUBLICATIONS

Non-Final Office Action in related U.S. Appl. No. 14/556,034 dated Jun. 22, 2020 (13 pages).
(Continued)

*Primary Examiner* — Srilakshmi K Kumar
*Assistant Examiner* — Jing Gao
(74) *Attorney, Agent, or Firm* — Pillsbury Winthrop Shaw Pittman, LLP

(57) ABSTRACT

A method and system for enhancement of video systems using wireless device proximity detection. The enhanced video system consists of one or more video capture devices along with one or more sensors detecting the presence of devices with some form of wireless communications enabled. The proximity of a device communicating wirelessly is sensed and cross referenced with received video image information. Through time, movement of wirelessly communicating mobile devices through a venue or set of venues can be deduced and additionally cross referenced to and augmented over image data from the set of video capture devices.

38 Claims, 13 Drawing Sheets

Related U.S. Application Data continuation-in-part of application No. 14/556,034, filed on Nov. 28, 2014.

(60) Provisional application No. 62/382,246, filed on Aug. 31, 2016.

(51) Int. Cl.
*H04N 21/83* (2011.01)
*G06Q 10/06* (2012.01)

(58) Field of Classification Search
CPC ......... G06T 7/579; G06T 7/74; G06T 1/0007; G06T 2207/30201; G06T 2207/30232; G06T 3/0087; G06T 7/00; G06T 7/292; G06T 7/596; G06T 7/60; G06T 7/62; G06T 7/73; H04N 7/181; H04N 7/188; H04N 13/106; H04N 13/246; H04N 5/77; H04N 13/10; H04N 13/156; H04N 13/204; H04N 2213/001; H04N 5/765; H04N 7/18; H04N 5/23229; H04N 7/185; H04N 13/254; H04N 13/271; H04N 1/00153; H04N 1/00156; H04N 1/444; H04N 21/42201; H04N 21/42202; H04N 21/42203; H04N 21/83; H04N 5/144; H04N 5/23206; H04N 5/23216; H04N 5/23219; H04N 5/23238; H04N 7/183; H04N 9/3194; H04N 9/8042; G06Q 20/12; G06Q 30/06; G06Q 10/0637; G06Q 30/02; G06Q 30/0601; G06Q 30/0643; G06Q 50/01; G06Q 10/063; G06Q 10/063114; G06Q 20/0453; G06Q 30/0202; G06Q 30/0205; G06Q 30/0241; G06Q 30/0252; G06Q 30/0259; G06Q 30/0266; G06Q 50/265; H04W 4/029; H04W 4/185; H04W 84/042; H04W 84/12; H04W 4/00; H04W 4/023; H04W 4/02; H04W 4/027; H04W 4/026; H04W 4/30; H04W 4/33; H04W 4/44; H04W 4/80

See application file for complete search history.

(56) References Cited

U.S. PATENT DOCUMENTS

| | | |
|---|---|---|
| 5,722,064 A | 2/1998 | Campana, Jr. |
| 7,974,598 B2 | 7/2011 | Kong |
| 2010/0195445 A1* | 8/2010 | Calhoun ............... G01S 5/0205 367/127 |
| 2011/0183688 A1 | 7/2011 | Dietrich |
| 2012/0212582 A1* | 8/2012 | Deutsch ................ G16H 40/20 348/46 |
| 2013/0229930 A1 | 9/2013 | Akay |
| 2015/0102963 A1 | 4/2015 | Marshall |
| 2015/0116501 A1* | 4/2015 | McCoy ............. H04N 5/23299 348/169 |

OTHER PUBLICATIONS

Final Office Action in related U.S. Appl. No. 14/556,036 dated Jan. 26, 2021 (29 pages).

* cited by examiner

ENHANCED VIDEO SYSTEM

CROSS-REFERENCE TO RELATED APPLICATIONS

This application is a continuation of U.S. patent application Ser. No. 15/640,209 (filed Jun. 30, 2017), which claims priority from provisional U.S. patent application Ser. No. 62/382,246 (filed Aug. 31, 2016). This application is a continuation-in-part of, and claims the priority of, U.S. patent application Ser. No. 14/556,034 (filed Nov. 28, 2014). The entire content of each aforementioned patent filing is hereby incorporated by reference.

BACKGROUND OF INVENTION

Field of Invention

The present invention relates to the use of proximity detection and recognition of mobile communications devices such as smart phones to enhance video systems consisting of cameras and other video or image capture devices along with video or image storage, analysis, and display subsystems.

Description of Related Art

Video systems are widely deployed for surveillance purposes by venue operators. Such systems use a plurality of video camera units, a communication network to transmit the video data and other related data such as motion detector data; a data storing terminal for receiving and storing the video data from the video camera units through the network; a display terminal, for displaying the video data from the data storing terminal and the video camera units; and one or more control servers.

Understanding visitor behavior is critical to the design, operation and optimization of public spaces. Visitor behavior information is valuable to both owner/operator of the space, venue or real estate as well as the security personnel and merchant staff operating therein. Newer generation video surveillance systems make use of image analysis to automatically detect and alert on certain conditions relevant to the system operator for the purposes, for example, of physical security. Such image analysis and condition detection include, for example, detection of a person loitering in a single camera's field of view. Given a single video capture device or camera has a limited field of view such analysis is limited.

Detection of the path of a moving object across the combined field of vision from multiple single video capture devices or cameras is a current area of active research. Such systems require substantial calibration as well as image analysis resources and are subject to error.

Adoption of mobile devices including mobile phones, smart phones, and tablets has enabled new means of understanding visitor interaction with a specific venue or set of venues.

Mobile devices are typically aware of their location thanks to technologies such as the global positioning system (GPS) and can provide this information to both software applications as well as the mobile communication network itself. GPS requires the mobile device to have a clear view of the sky in order to receive positioning information from multiple GPS satellites which are typically deployed above the equator in geosynchronous orbit. Because of this, GPS does not work well indoors or in outdoor locations that have obscured access to the portion of the sky where GPS satellites appear. This includes outdoor locations with tall buildings or other large infrastructure such as bridges (referred to as "urban canyons") and areas with dense foliage.

Mobile communications networks also have extensive positioning capabilities. Terrestrial based mobile communications network deploys a large number of base stations. The design of mobile communications networks has the mobile device stay in constant association with one or more base stations. As a result, the mobile communications network has information about the macro location of a mobile device. The range of a base station can be several miles in diameter and accurate positioning is made difficult due to signal strength fluctuations and other technical challenges.

Newer systems such as "Assisted GPS" are designed to combine information from GPS and mobile communications networks to improve accuracy. These systems also suffer from accuracy problems when GPS coverage is lost for extended periods of time.

Alternatives to satellite based location systems are emerging. One such example involves frequently sensing and recording the identification (typically by MAC address) and the signal strength of all the 802.11 based WiFi access points at a specific location. This recording is typically performed with a specially designed vehicle. When a mobile device needs to know its position, the mobile device itself can sense all the 802.11 access points in its vicinity and compare this with the previously recorded information to determine its location. This approach is effective in urban locations where GPS does not perform well. Increased AP ("Access Point") density and frequent recording increase the accuracy of this type of system. These kinds of systems also operate independently of the mobile communications network. Once location is determined at the mobile device, it can be used by software applications on the mobile device to, for example, display location on a map background or it can be reported to a central server via the Internet.

Various systems exist to furnish information to venue operators related to visitor behavior in retail and public spaces. These include thermal cameras, stereoscopic video cameras, and infrared light beams as well as other more application specific technologies such as road induction loops.

Such systems lack the ability to accurately detect and report on behavior of visitors between visits to a venue. This is an active area of innovation. Innovations in camera technology including facial recognition are being actively pursued by several parties.

To improve venue operator understanding of the behavior of visitors to their venue or venues, an improved system would be useful for enabling better understanding of the behavior of customers including visit frequency, visit duration, visit path with mobile devices.

One solution is to provide a system for receiving information transmitted by wirelessly communicating mobile devices and inferring behavior from this information.

This understanding of visitor path or movement through a venue can be combined with video capture device or camera based video surveillance systems. This combination provides for more effective use of such camera or video based venue surveillance systems.

SUMMARY OF THE INVENTION

The present invention integrates proximity recognition of wireless enabled mobile devices and associated mobile device user movement with video systems (typical used for surveillance).

In accordance with the present invention, there is provided a system and process which enables a venue operator to understand the behavior of visitors who carry wirelessly communicating mobile devices in combination with video systems consisting of one or more video and/or image capture devices.

Accordingly, the present invention involves one or more proximity recognition devices (PROs) operating at a venue. Electromagnetic communications interactions between wireless communicating mobile devices and related wireless communications infrastructure are recorded by the proximity recognition device PRD, analyzed and sent to the central controller. Knowledge of interactions with mobile devices provides the proximity recognition system (PRS) with the ability to detect presence and specific location of the mobile device (i.e. its associated visitor) within the venue. As visitors move through the venue, the proximity recognition system (PRS) combines, cross references and/or shares its understanding of visitor behavior with video system to enable more effective surveillance of the venue.

Accordingly, the present invention involves improvement of location accuracy. As location accuracy improves with the amount of interaction (between mobile devices and the system's PRD) to analyze, the PRD may optionally be tuned to prompt more or less interaction with the mobile device based on the objectives of the venue operator.

Accordingly, the present invention involves improvement of location accuracy through common trilateration and triangulation techniques on interaction data received from three or more in PRDs in the venue. It is also possible to determine location information based on a single PRD. This location information is obviously less accurate compared to location information that is based on multiple PRDs.

In one embodiment, the PRS uses PRO functionality commonly incorporated into wireless communications infrastructure devices including WiFi access points (APs). In another embodiment, the PRS makes uses of dedicated PRS sensor devices. In another embodiment, the PRS makes use of a combination of existing wireless communications infrastructure devices and dedicated PRD sensor devices. In another embodiment, the PRS (and/or PRD(s)) and the Video Capture Device (VCD) are incorporated in the same device (with the result that their respective electromagnetic interactive field and visual field of view, are (at least, partially) co-extensive).

Accordingly, the present invention's central controller of the proximity recognition system (PRS), in one embodiment, is designed to run as an Internet connected appliance providing a cloud based service. Alternative embodiments enable the central controller to be run by a by a third party providing new or existing merchant analytics service including "footfall" analytics and/or video based security services. When the customer enters a specific merchant venue, the system recognizes the event based on the detection of the visitor's wirelessly communicating mobile device. Visitor behavior such as path taken through the venue and visit duration is reported to the central controller for appropriately anonymized analysis by the venue's staff.

Accordingly, the present invention involves analysis by the central controller of information received from a plurality of proximity recognition devices PRDs deployed in venues connected to the central controller by a communications network such as the Internet. This information is then cross referenced with received video image information by the central controller to provide an enhanced video system (EVS). Results of this analysis are then transmitted to or available for display to venue operator or its staff, subcontractors, or agents at their request.

The cross referencing of video image data with mobile device proximity is based on a correlated geospatial understanding of the venue in which the EVS is operating. Given an EVS with a plurality of video capture devices (VCDs) and a plurality of PRDs, the EVS can cross reference a given VCD's field of view at a given instance in time with PRDs in the vicinity and, as a result, use information from these PRDs to determine the one or more mobile devices expected to be within the given VCD's field of view at a given instance in time.

When focused on a given VCD's field of view at present, this correlated understanding between the VCD's field of view and mobile devices in the given VCD's field of view enables the EVS to determine the previous locations within the venue of the mobile devices in the VCD's field of view at present time. Image data from those previous locations can optionally be retrieved and displayed to an operator.

When focused on a given VCD's field of view at some given time in the past, this correlated understanding between the VCD's field of view and mobile devices in given VCD's field of view enables the EVS to determine the previous and future (with respect to the given time in the past) locations of the mobile devices in the VCD's field of view at the past time of interest.

Given two or more distinct fields of view from the same VCD at different, specified times or two or more different VCDs at different, specified times, the EVS can determine the commonality of mobile devices that were in or in the vicinity of the given fields of view at the specified times. This is useful for identifying one or more devices of interest (DoIs) whose behavior including path through the venue or series of monitored venues can be examined.

When focused on a given VCD's field of view at some given time, the EVS can determine movement of multiple mobile devices having the same approximate path through the venue and/or current visit arrival time and/or previous arrival times or any combination of similar facts to define a group. Arrival and movement of groups could optionally produce alerts for staff tasked with venue security and safety.

When focused on a given VCD's field of view at some given time, the image display can be augmented to show behavioral characteristics of each mobile device and its presumed user in the given VCD's field of view. This can include information about previous venue visit history associated with the mobile device, arrival time, dwell time at the venue during this and/or previous visits, possible movement within a group of people, group detail such as size of group as well as information about the mobile device's path through the venue during this and/or previous visits. Suggest augmented images could be filtered accordingly to user defined criteria.

The correlated understanding between a VCD's field of view and mobile devices expected to be within the proximity of the VCD's field of view is bidirectional. In addition to the correlation of given VCD's field of view at a specific instant in time to mobile devices in the proximity of the field of view, a specifically identified and detected mobile device or set of mobile devices can be correlated back to a set of images expected to have the mobile device and its user in view at a specific instant in time.

Given a set of previous and possibly relatively future locations of one or more devices of interest (DoIs), the EVS can, then, in near real time continue to determine their present location and enable the display of current imagery from the one or more VCDs whose fields of view are expected to contain the DoI(s) and their associated user. Optionally, imagery can be augmented to show the DoIs and their associated users. Such "find and follow" functionality is expected to be useful in various video surveillance scenarios.

DETAILED DESCRIPTION OF THE INVENTION

Figure 1:
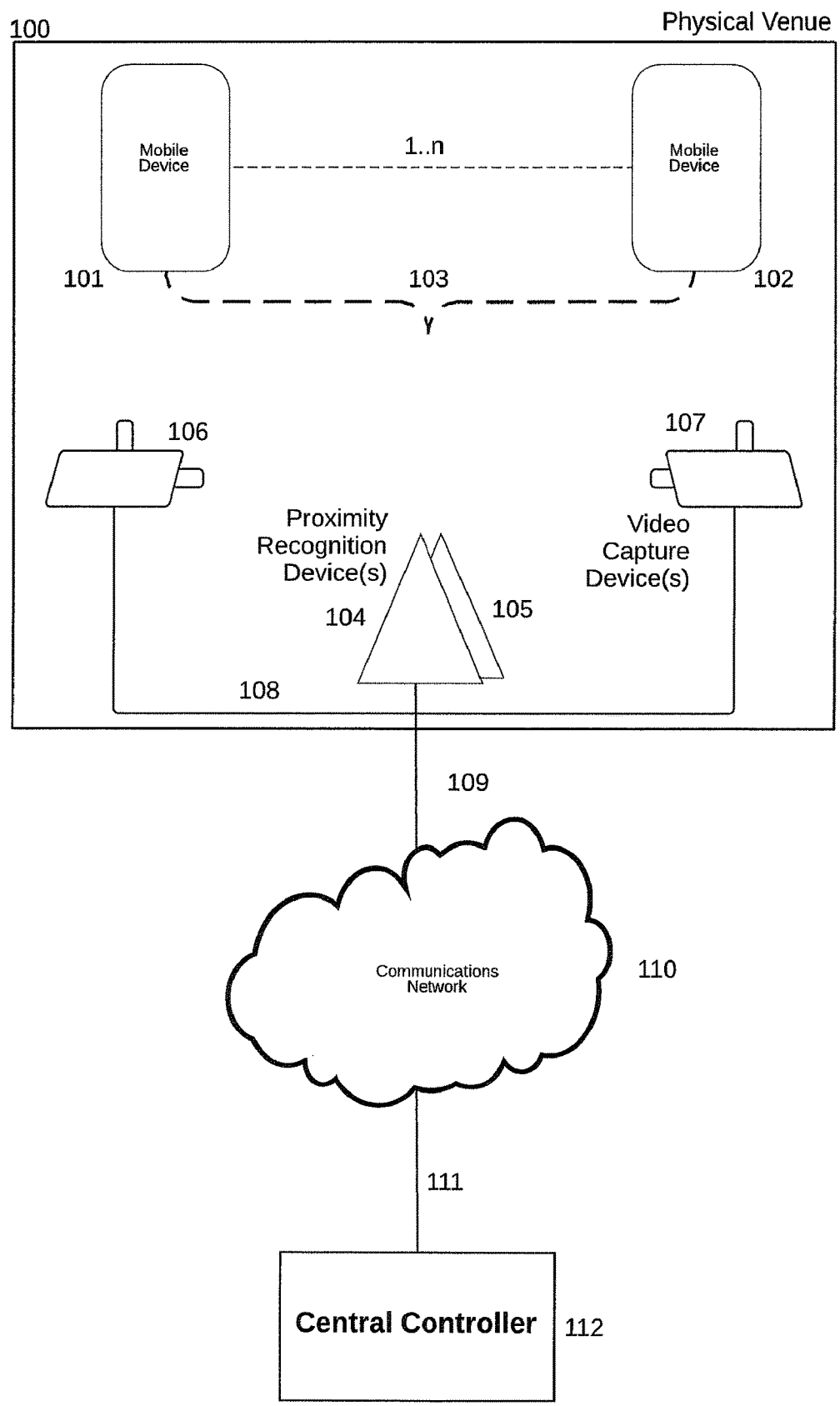
FIG. 1 illustrates the system architecture of the enhanced video system (EVS).

In this section, the present invention is described in detail with regard to the drawing figures briefly described above.

For purposes of description the following terms have these meanings:

The terms "real estate provider", "venue owner", "venue operator", "real estate operator" and "real estate owner" unless otherwise specified below are used interchangeably to refer to the entity that owns and/or operates real estate space. Real estate providers in the context of the present invention are interested in one or both of the following objectives: understand behavior of visitors to their owned and/or operated space and ensure the security of visitors, tenant staff, and operations personnel within their owned and/or operated space.

The terms "venue", "physical venue", "premise", "space", "real estate", and "real estate premise" unless otherwise specified below are used interchangeably to refer to a specific physical space owned and/or operated by a real estate provider. Venues include malls, stores, parking facilities, shops, and theatres as well as other types of spaces including hotels, motels, inns, airports, warehouses, dock facilities, arenas, hospitals, schools, colleges, universities, corporate campuses, libraries, galleries, stations, parks, parking lots, and stadiums. In alternate embodiments of the invention, space may include roadways on which vehicles operate.

The terms "WiFi", "Wifi", "WLAN", "Wireless Fidelity", and "wireless local area network" all refer to communications between mobile devices and infrastructure elements (commonly referred to as "access points" or APs). WLAN refers to devices and infrastructure using some variant of the 802.11 protocol defined by the institute of Electrical and Electronics Engineers (IEEE) or some future derivation.

The terms "video system", "video management system", "video security system", and "physical security system" all refer to systems deployed with one or more video capture devices, video storage either at the venue or in a central controller or some combination, and video display along with optional systems components for video analysis, access control, and other sensor technology such as sensor technology for the purposes of venue surveillance and related security.

The terms "mobile device", "wireless device", "wirelessly communicating mobile devices", and "wireless enabled device", all refer to devices equipped to communicate over a wireless communications network including wireless communications networks using the 802.11 protocol or other wireless communications technologies such as LTE, WiMax, Bluetooth, or "5G".

The terms "visitor", "guest", "user", or "invitee" unless otherwise specified below, are used interchangeably to refer to any party that visits a venue.

The term "image information", "video information", "video image data", "image data", "camera data", "video frames", and "video frame data" unless otherwise specified below, are used interchangeably to refer to the series of images of a scene captured by a video capture device (VCD) often referred to as a camera and sent to the EVS central controller. These VCD images have one or more timestamps indicating when the image was captured by the VCD and, optionally, when the image was processed by the EVS in some way. These VCD images also have an implied or explicitly defined field of view which is considered to be part of overall image information. This field of view information may be static or dynamic in the case where the VCD can be panned, tilted or zoomed, Optionally, image information can include additional information about the scene and/or objects detected in the scene. This optional scene or object information may be generated by the VCD itself or some external device that has access to the series of images produced by the VCD.

The term "field of view", "VCD field of view", and "camera field of view" unless otherwise specified below, are used interchangeably to refer to the fixed or possibly dynamic area that a VCD or camera device has visibility to at any given instant in time. It is noted that the field of view of a VCD or camera has a theoretical maximum shape in three dimensions ("theoretical field of view") but is subject to both short term obstructions such as lighting conditions and objects such as people moving dynamically in the scene visible in the VCD or camera's field of view as well as semi-permanent obstructions from objects such as signs and walls which may have been in the VCD's field of view upon installation or which may have been placed in the VCD's field of view after VCD installation. It is noted that obstruction of a VCD field of view can impair the VCD's usefulness. It is further noted that PRDs and the associated PRS are not subject to such field of view obstructions and can detect mobile devices in the theoretical field of view but obstructed from practical VCD view ("practical field of view") as well as mobile devices in the vicinity of a VCD field of view.

The above defined terms are used to describe the preferred embodiment of the present invention in reference to the attached drawing figures. Where appropriate, parts are referred to with reference numerals.

Referring to FIG. 1, the principal components used to implement the present invention are illustrated in a block diagram. A system and method is provided for enhanced video surveillance by combining video capture devices along with wireless proximity detection capabilities which recognize and classify wirelessly communicating mobile devices. The enhanced video system (EVS) receives and optionally analyzes video images while receiving and analyzing information regarding the presence of wirelessly communications devices at one or more known locations depicted in FIG. 1 as 100. As video images are captured by one or more video capture devices depicted in FIG. 1 as 106 and 107 and transmitted to a central controller 112 via communications interface 108, the proximity of a wirelessly communicating mobile device 101 or plurality of wirelessly communicating mobile devices 101, 102, 103 is sensed by examining the signal information (e.g. signal strength) at one or more proximity recognition devices PRDs 104, 105 when, for example, the wirelessly communicating mobile device 101 initiates a communications request. The threshold of the signal information to signify detection and proximity, is adjustable by user to adjust the physical dimensions of the detection field of the PRDs. An identifier of the wirelessly communicating mobile device may be provided in the communications request. Communication requests may be sensed by one or a plurality of proximity recognition devices PRDs 104, 105. Information received by the proximity recognition devices PRDs is analyzed, summarized and sent to the Central Controller via communications interface 108. Communications interface 108 is comprised of some combination of cable modems, DSL, DS1, DS3, SONET, Ethernet, fiber optic, WiMax, WiFi 802.11 or other wireless technology such as CDMA, GSM or long term evolution (LTE) or other future communications capability to a communications network 110 such as the Internet. Image information received by the video capture devices (VCDs) 106, 107 is optionally stored for later retrieval, optionally analyzed, and sent to the Central Controller 112 via communications interface 108. The Central Controller 112 received information from VCDs 106,107 and PRDs 104, 105 using communications interface 111 to a communications network 110. Image information from the VCDs and the PRDs may be transported over the same communications interface 108 and network 110 or in an alternative embodiment over separate communications infrastructure.

In the present context, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, solid state drives, tape, erasable programmable read-only memory (EPROM or flash memory), or any magnetic, electromagnetic, infrared, optical, or electrical system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer readable instructions may be referred to as components or modules. Applications may be hard coded in hardware or take the form of software executing on a general purpose computer such that when the software is loaded into and/or executed by the computer, the computer becomes an apparatus for practicing the invention, or they are available via a web service. Applications may also be downloaded in whole or in part through the use of various development tools which enable the creation, implementation of the present invention. In this specification, these implementations, or any other form that the invention may take, may be referred to as techniques. In general, the order of the steps of disclosed processes may be altered within the scope of the invention.

Various embodiments of EVS are possible. VCD and PRD functionality make be implemented in separate devices installed and operating in the venue. VCD and PRO functionality may be implemented in a single device type installed and operating in the venue. As well, hybrid embodiments including separate and combined device types are possible.

Figure 2:
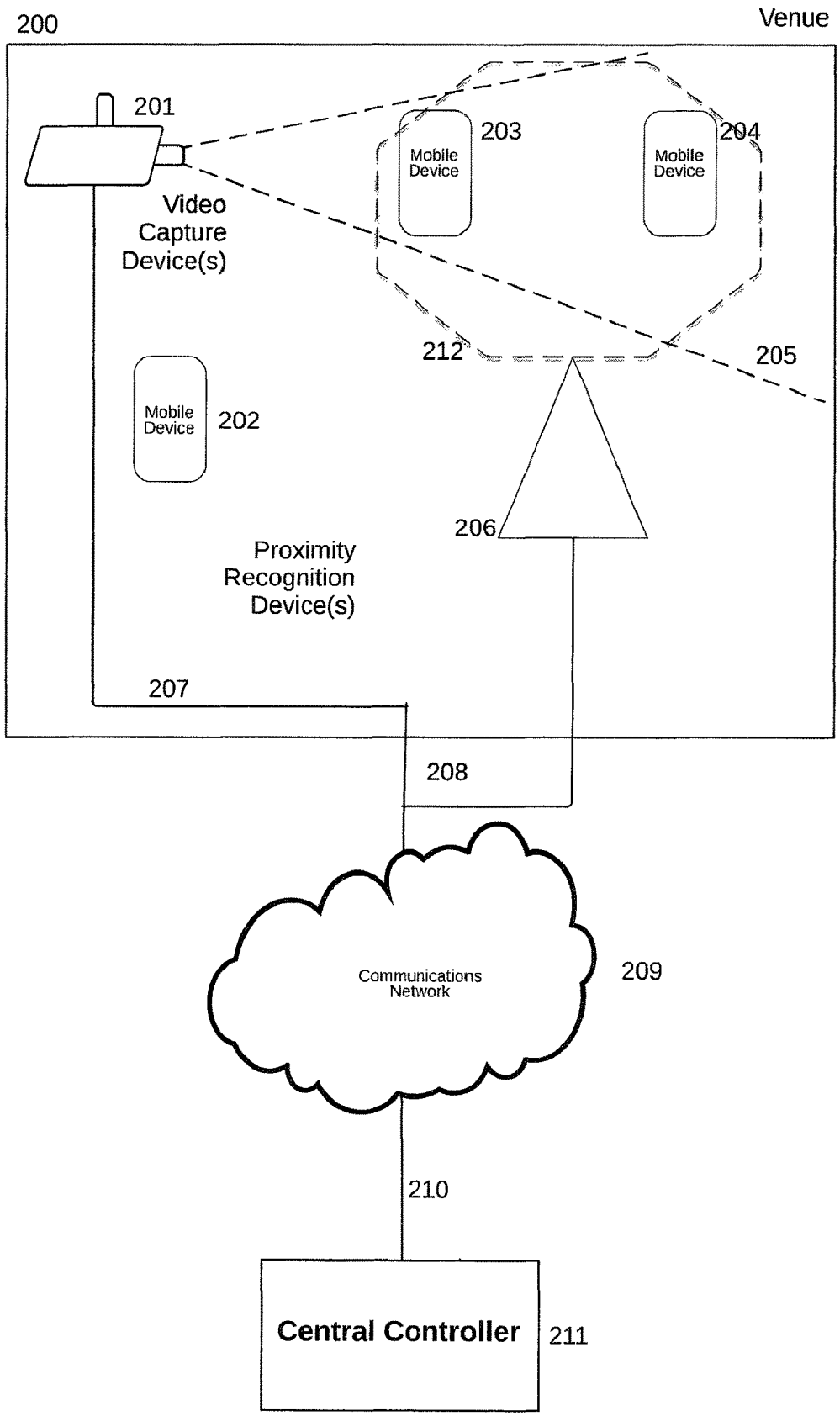
FIG. 2 illustrates the relationship between mobile devices and the field of view of a video capture device (VCD).

With reference to FIG. 2, a block diagram of illustrating the relationship between mobile devices and the field of view of a video capture device (VCD).

Within a typical deployment venue environment 200, one or more VCDs 201 and one or more PRDs 206 may be connected to the venue's existing communications network 207. In various embodiments, PRDs 206 and VCDs 201 may be connected to the venue's communications network 207 via some type of wired connection such as Ethernet 207 or wirelessly such as WLAN network 407 in the venue. Venue's communication network 207 is attached by a communications interface such as DSL or cable modem 208 to wide area communications network 209 such as the Internet.

Within the venue, the VCDs record and transmit for optional storage images with a given field of view at a given frequency. In some cases, image recording may be triggered by an external event such as motion detection.

The VCDs send image Information on an event or periodic basis to the central controller 211 via communications network 209 and associated communications interface 210.

In this described embodiment, communications network 209 coupled to the venue's communications network 207 by communications interface 208.

Within the venue, a plurality of mobile devices 202, 203, 204 is expected to arrive and depart to and from the venue in a random nature. The PRD 206 or PRDs observes communications signals from these mobile devices in its vicinity.

At any given time, these zero or more of these mobile devices 202, 203, 204 present at the venue and their associated users may be within the field of view 205 of a VCD 201 deployed in the venue. In the particular scenario depicted, mobile devices 204 and 203 are within the field of view 205 of a VCD 201 deployed in the venue. It is possible that mobile device 202 is known to be in the venue (e.g. by the electromagnetic communications interactions sensed by PRS/PRDs) but is not in the field of view of a VCD deployed in the venue.

The PRDs 206 also reports information regarding mobile device observations on an event or periodic basis to the central controller 211 of the enhanced video system via communications network 209 which in this described embodiment is coupled to the venue's communications network 207 by communications interface 208.

The Central Controller 211 can cross reference the field of view of a given VCD 201 with mobile device location information received from PRO 206 to determine the list of mobile devices expected to be in the field of view VCD 201 at a specific instance in time. The Central Controller 211 has a geospatial understanding of both the VCD 201 field of view 205 as well as the geospatial capability to determine the intersection of a given VCD field of view with mobile device location information received from the proximity recognition devices PROs 206 and their associated PRS subsystem. This geospatial understanding may, in one embodiment, use a global standard for geospatial location such as GPS uses or may use a local or venue specific, in another embodiment, of locations within the venue. In alternative embodiments, the field of view as well as mobile device location may be represented in three dimensions. In alternative embodiments, VCD field of view and calculated mobile device locations can be represented in two dimensions with an optional specification of the floor number if the venue has multiple floors.

In one embodiment, VCD fields of view are manually defined as two dimension polygons as an overlay of a physical venue's floorplan. The locations of the PRDs are also defined with respect to the same physical floorplan. This coordinated geospatial understanding of the venue enables EVS to determine the mobile devices within a given VCD's field of view at a given time and to, additionally, determine the zero or more views for a given mobile device's location in a venue at a given time using techniques well known to those skilled in the areas of two-dimensional geometry and computer science.

In an alternative implementation, the VCD field of view can be computed in three dimensional space based on the VCD's location, the three dimensional orientation of the camera (i.e. the angle that it is pointing at) and specification or assumption of the shape of the VCD's field of view. Given a coordinated geospatial understanding with the PRDs deployed in a given venue, the EVS can cross reference between a given VCD field of view and the mobile devices expected to be in that VCD's field of view at a given instant in time as well as to cross reference from a mobile device's location at a specific instant in time to the zero or more VCD fields of view that the mobile device and its user are expected to appear in. Various mathematically techniques exist for determination overlap between three dimensional shapes such as a VCD's three dimensional field of view and mobile device location at a given instant in time. These mathematical techniques include the Sutherland-Hodgman algorithm as well as the algorithm developed by Teixeira and Creus.

In alternative implementations, the VCD's three-dimensional position and field of view can be manually defined in the EVS or, alternatively, can be sensed by the VCD itself using additional sensor technology such as GPS and gyroscope devices such as the AGD1 2022 FP6AQ gyroscope device designed by STM Electronics used in the iPhone 4 smartphone developed by Apple Inc. of Cupertino, Calif. In this alternative embodiment where the VCD senses its position and orientation, this information would be supplied to the EVS central controller 211 to enable it to cross reference between VCD image information specifically a frame of video imagery received by the EVS central controller 211 from the VCD 201 and mobile devices 203 204 in this particular VCD's field of view at a specific instant in time.

Additionally, the zero or more VCD fields of view can be determined given a mobile device location sensed by the one or more PRDs in the venue at specific instant in time. Once these fields of view are determined, the associated VCDs can be determined and the associated image information from the zero or more VCDs can be displayed from the associated instant in time showing the user of the associated mobile device. This can be done repeated for every known location of the same mobile device to visually depict the path of the mobile device through the venue from its arrival to its departure. Additionally, image information from a prior or future visit of the mobile device and its associated user can be shown for each time a location is sensed for a given mobile device by the one or more PROs in the venue by determining the zero or more associated VCD fields of view the mobile device is sensed and determined to be in and then showing the image information for the associated zero or more VCDs at the associated instant in time.

The PRS functionality of the EVS central controller 211 and the one or more PRDs 206 deployed at the venue 200 can also be used to determine if a given mobile device of interest remains at the venue 200 but is not in any of the practical fields of views of any of the VCDs 201 deployed at the venue 200. This functionality is useful for determining if the user associated with the mobile device of interest is in a theoretical field of view but is not evident in the image information received from any to the VCDs 201 deployed in the venue 200 because of some form of obstruction or is in the vicinity of a VCD 201 but not in the current field of view 205.

Given two or more distinct fields of view from the same VCD at different, specified times or two or more different VCDs at different, specified times, the EVS can determine the a list of zero or more mobile devices that were in or in the vicinity of the given fields of view at the specified times. This knowledge can be used to identify one or more devices of interest (DoIs) whose behavior including path through the venue or series of monitored venues can be examined and alerted on according to some rules provided by a human operator or an external system. In an alternative embodiment, knowledge path or movement information associated with one or more mobile devices can be used by the EVS to augment video search and other video analytics functions.

Figure 3:
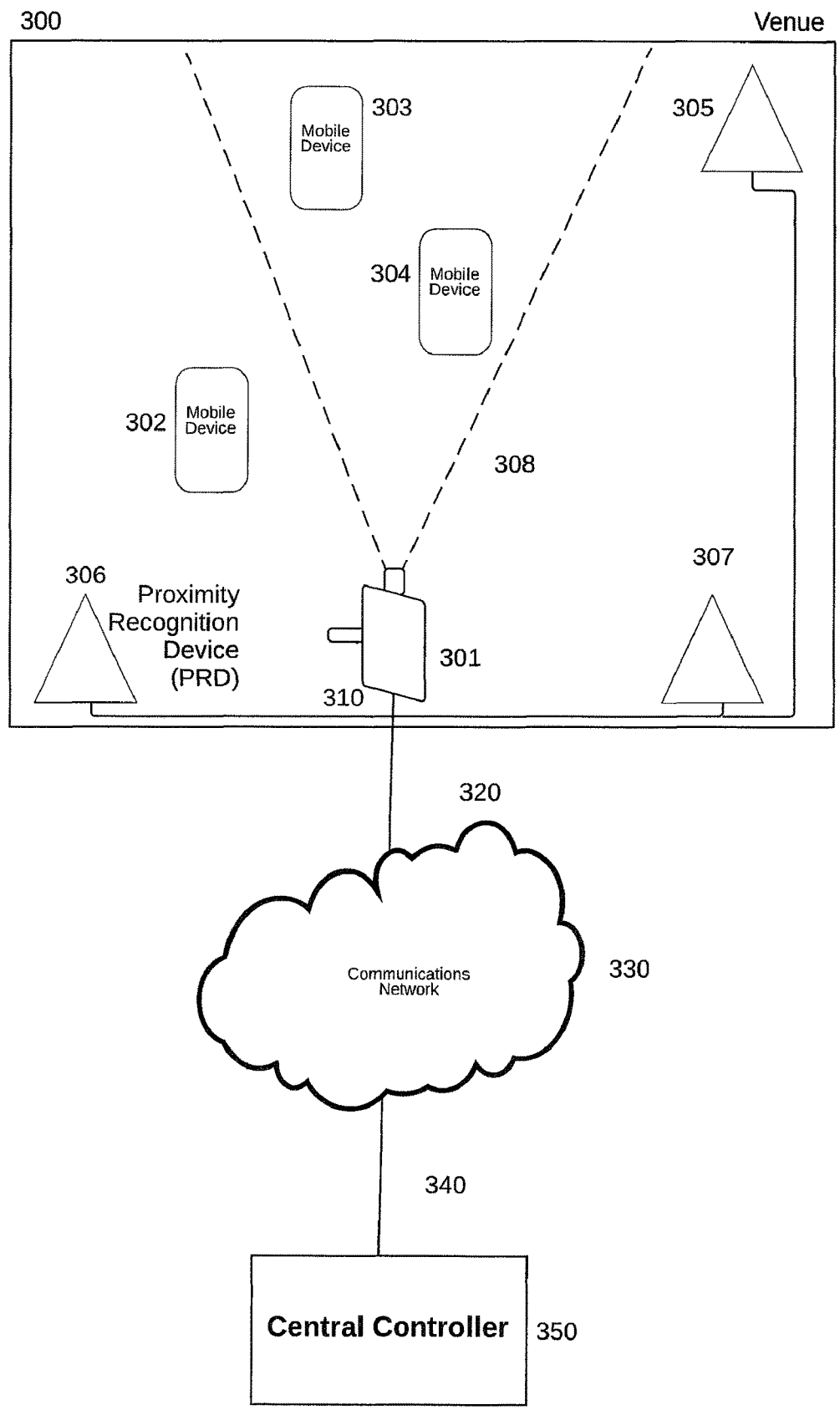
FIG. 3 illustrates the relationship between mobile devices detected by multiple proximity detection devices (PRDs) and the field of view of a video capture device (VCD).

With reference to FIG. 3, a block diagram of illustrating the relationship between mobile devices detected by multiple proximity detection devices (PROs) and the field of view of a video capture device (VCD).

Within a typical deployment venue environment 300, one or more VCDs 301 and one or more PRDs 306, 307, 208 may be connected to the venue's existing communications network 310.

Within the venue, the VCDs 301 record and transmit for optional storage images with a given field of view at a given frequency.

Within the venue, a plurality of mobile devices 302, 303, 304 is expected to arrive and depart to and from the venue in a random nature. The PRO 306, 307, 305 observes communications signals from these mobile devices in their vicinity. When a mobile device communication is observed by three or more PRDs, standard trilateration, triangulation, time of flight, or some combination of these or other location calculation techniques may be utilized to determine the location of the mobile device with the venue.

At any given time, these zero or more of these mobile devices 302, 303, 304 present at the venue and their associated users may be within the field of view of a VCD 301 deployed in the venue. In the particular scenario depicted, mobile devices 304 and 303 are within the field of view 308 of a VCD 301 deployed in the venue. Mobile device 302 is known to be in the venue but is not in the field of view 308 of a VCD 301 deployed in the venue.

Image information from the deployed VCDs 301 and mobile device information from the PROs 306, 307, 305 is communicated to Central Controller 350 via communications network 330.

The Central Controller 350 cross references image and field of view information from the VCDs 301 with the mobile device location information as derived from information received from the PRDs 305, 306, 307. In one embodiment, this cross referencing is accomplished by comparing the three-dimensional location of the mobile devices 302, 303, 304 with the three dimensional fields of view 308 of the one or more VCDs 301 deployed at the venue using location reference information stored in the Central Controller's VCD database 836 and PRD database 832. Various mathematic techniques are well known for cross referencing and may be used to accomplish this intersection calculation task. These include polygonal intersection algorithms developed by Sutherland-Hodgman and Teixeira and Creus In another embodiment, this cross referencing is based on user-defined rules and parameters. In an alternative embodiment, field of view 308 can be defined in the EVS using PRS-related functions to cross reference between mobile devices sensed by PROs 305, 306, 307 that map into the field of view 308 which is visible to VCD 301.

In one embodiment, the field of view of one VCD at a specific instant in time (may include previous X seconds) may be used to calculate the mobile devices known to be visible to this VCD at this time. Once this set or cohort of mobile devices of interest is determined, the cohort can be reviewed to determine their current and past visit behavior including association patterns with other mobile devices and their associated users.

Figure 5:
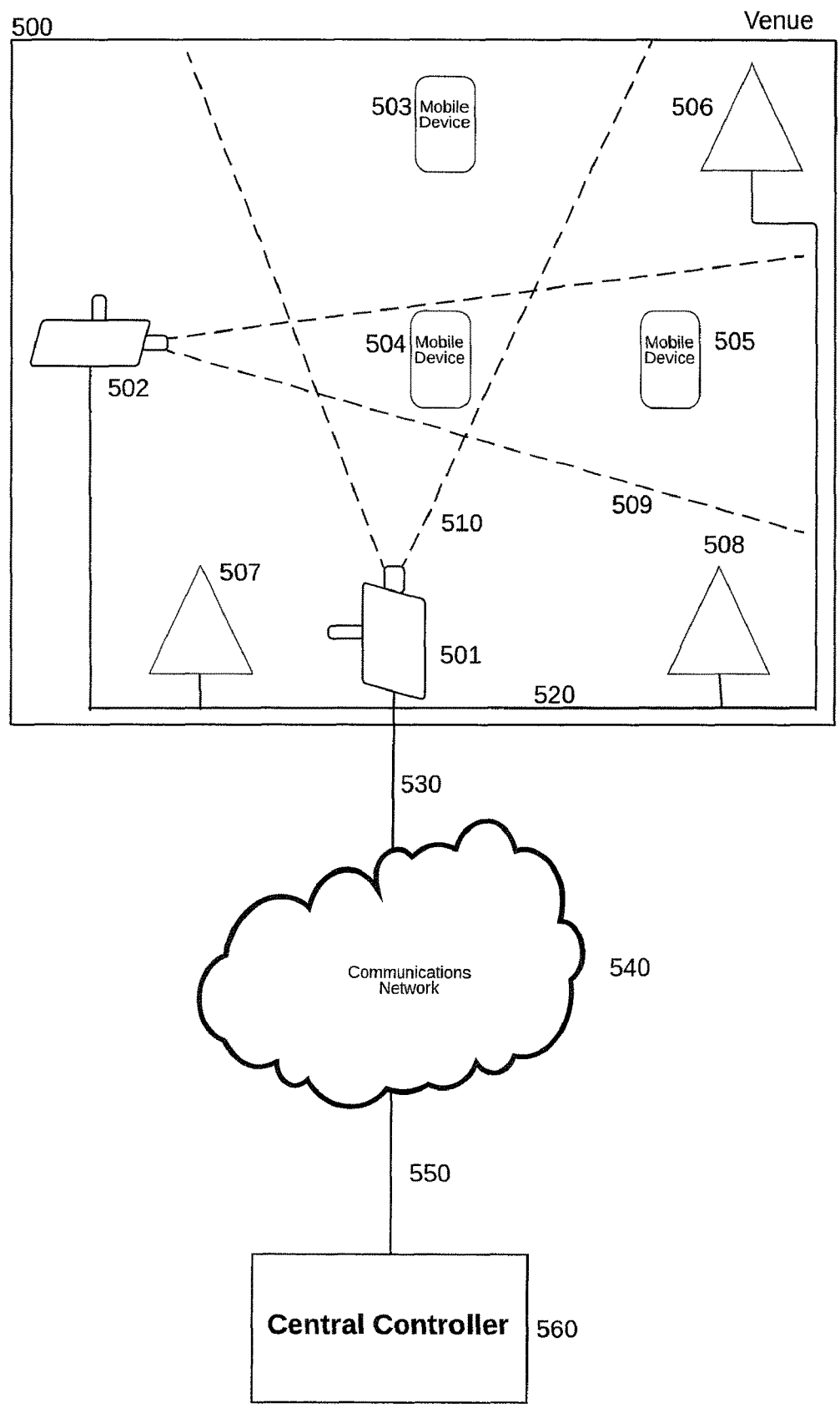
FIG. 5 illustrates the relationship between mobile devices detected by multiple proximity detection devices (PROs), the fields of view of a multiple video capture devices (VCDs).

With reference to FIG. 5, a block diagram illustrating the relationship between mobile devices detected by multiple proximity detection devices (PRDs), the fields of view of a multiple video capture devices (VCDs) that may be installed in the venue.

Within a typical deployment venue environment 500, a plurality of PRO devices 506, 507, 508 and a plurality of VCD devices 501, 502 may be required. With reference to the specific embodiment example depicted in FIG. 5, PROs 506, 507, 508 and VCDs 501, 502 may be connected to the venue's existing communications network 520. In various embodiments, the VCDs and PRDs may be connected to the venue's communications network 520 via some type of wired connection such as Ethernet or wirelessly such as WLAN network. Venue's communication network 520 is attached by a communications interface such as DSL or cable modem 530 to wide area communications network 540 such as the internet.

Within venue 500, a plurality of wirelessly communicating mobile devices 503, 504, 505 are expected to arrive and depart to and from venue 500 in a random nature. The PRDs in the venue observe communication signals from wirelessly communicating mobile devices in its vicinity including, in one embodiment, WLAN communications.

As the wirelessly communicating mobile devices 503, 504, 505 are expected to arrive and depart to and from venue 500, they will move through the fields of view of zero or more VCDs 501, 502. Depending on the deployment of the VCDs within venue, it is possible, at any given instant in time, a mobile device and its associated user could be with in the field of view of zero, or one, or more than one VCD field of view.

In the particular scenario depicted, mobile device 504 is within the field of view 509 of a VCD 502 as well as the field of view 510 of VCD 501. Mobile device 505 is in field of view 509 of a VCD 502 but not the field of view 510 of VCD 501. Mobile device 503 is in field of view 510 of a VCD 501 but not the field of view 509 of VCD 502.

The Central Controller 560 cross references image and field of view information from the VCDs 502, 501 with the mobile device location information as derived from information received from the PROs 506, 507, 508. This cross referencing is accomplished by comparing the location of the mobile device 503, 504, 505 with the fields of view 509, 510 of the one or more VCDs 501, 502 deployed at the venue using location reference information stored in the Central Controller's VCD database 836 and PRO database 832. Standard mathematic techniques such as the Sutherland-Hodgman algorithm may be used to accomplish this task.

In one embodiment, the location of the mobile device may be used to calculate the fields of view of the VCDs which would be expected to contain the wirelessly communicating mobile device and its user. For example, once the location of mobile device 505 is determined for the depicted specific instant in time, such cross referencing calculations would indicate that fields of view 509 and 510 would both contain images of mobile device 505 and its associated user.

Figure 6:
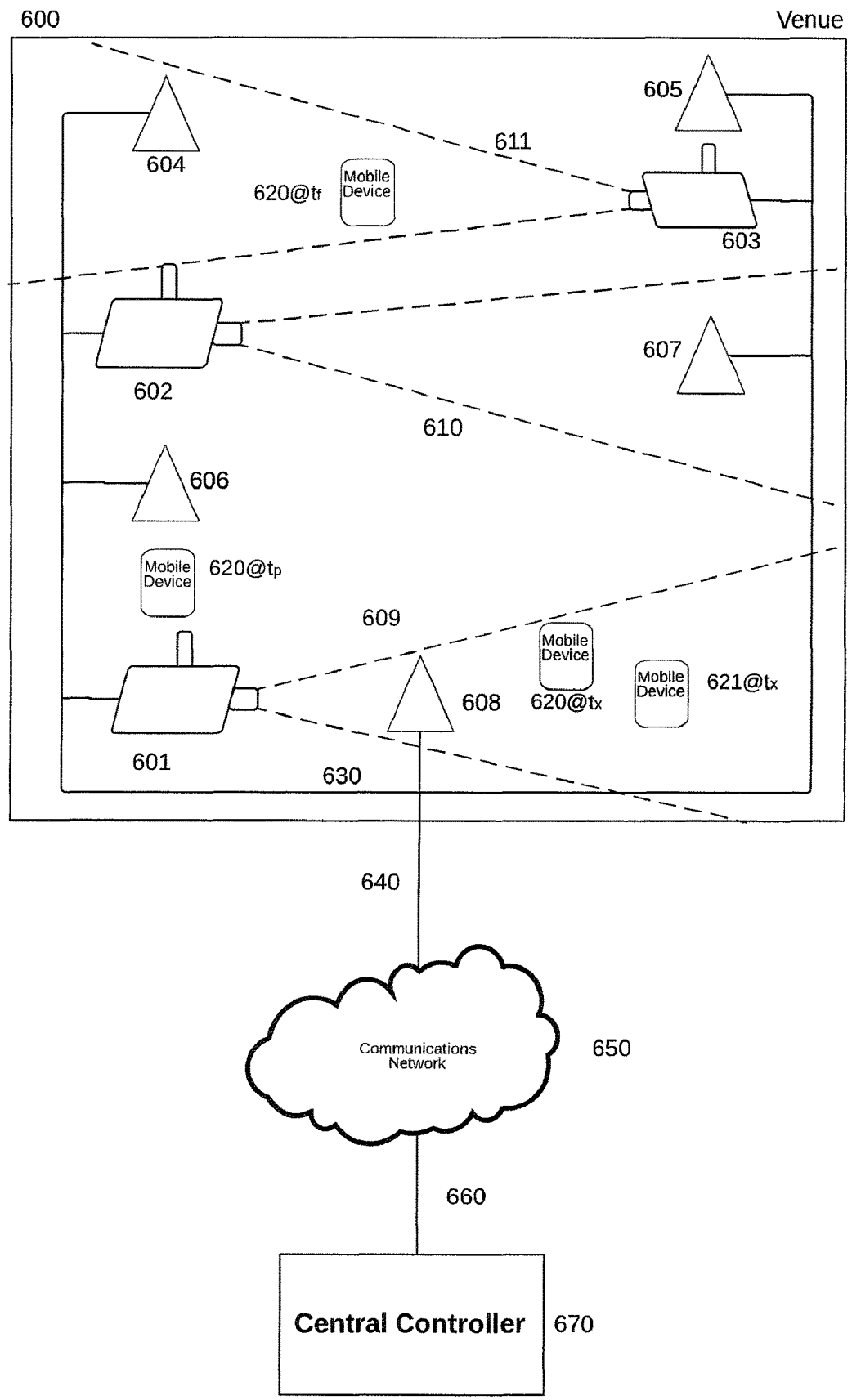
FIG. 6 illustrates the relationship between an example mobile device as it moves through a venue and the EVS.

With reference to FIG. 6, a block diagram illustrating the relationship between an example mobile device as it moves through a venue.

Within a typical deployment venue environment 600, a plurality of PRD devices 604, 605, 606, 607, 608 and a plurality of VCD devices 601, 602, 603 may be deployed. With reference to the specific embodiment example depicted in FIG. 6, PRDs 604, 605, 606, 607, 608 and VCDs 601, 602, 603 may be connected to the venue's existing communications network 630. Venue's communication network 630 is attached by a communications interface of some form 640 to wide area communications network 650 such as the Internet.

An example mobile device 620 is detected by multiple proximity detection devices (PRDs) and passes through the field of view of a multiple video capture devices (VCDs).

As the wirelessly communicating mobile devices 621, 620 are expected to arrive and depart to and from venue 600, they will move through the fields of view of zero or more VCDs 601, 602, 603. Depending on the deployment of the VCDs within venue, it is possible, at any given instant in time, a mobile device and its associated user could be within the field of view of zero, or one, or more than one VCD field of view.

At a specific instant in time denoted '$t_x$' in the example depicted, mobile device 620 is in the field of view 609 of VCD 601 as is another example mobile device 621. These are denoted in FIG. 6 as 620@$t_x$ and 621@$t_x$. It should be noted that $t_x$ may be at the present time or may be some past instant in time. Both possibilities are part of this invention.

Mobile device 620's past and future interaction with the venue or and any associated venues can be determined. In the example depicted, through cross reference analysis by Central Controller 670, mobile device 620 can be determined to have been in vicinity of VCD 601 but not within its field of view 609 at some specific instant in time denoted '$t_p$'. Through a similar process, the Central Controller 670, ca n determine that the same mobile device 620 at some specific instant in time denoted '$t_f$' is in the field of view 611 of VCD 603.

Figure 7:
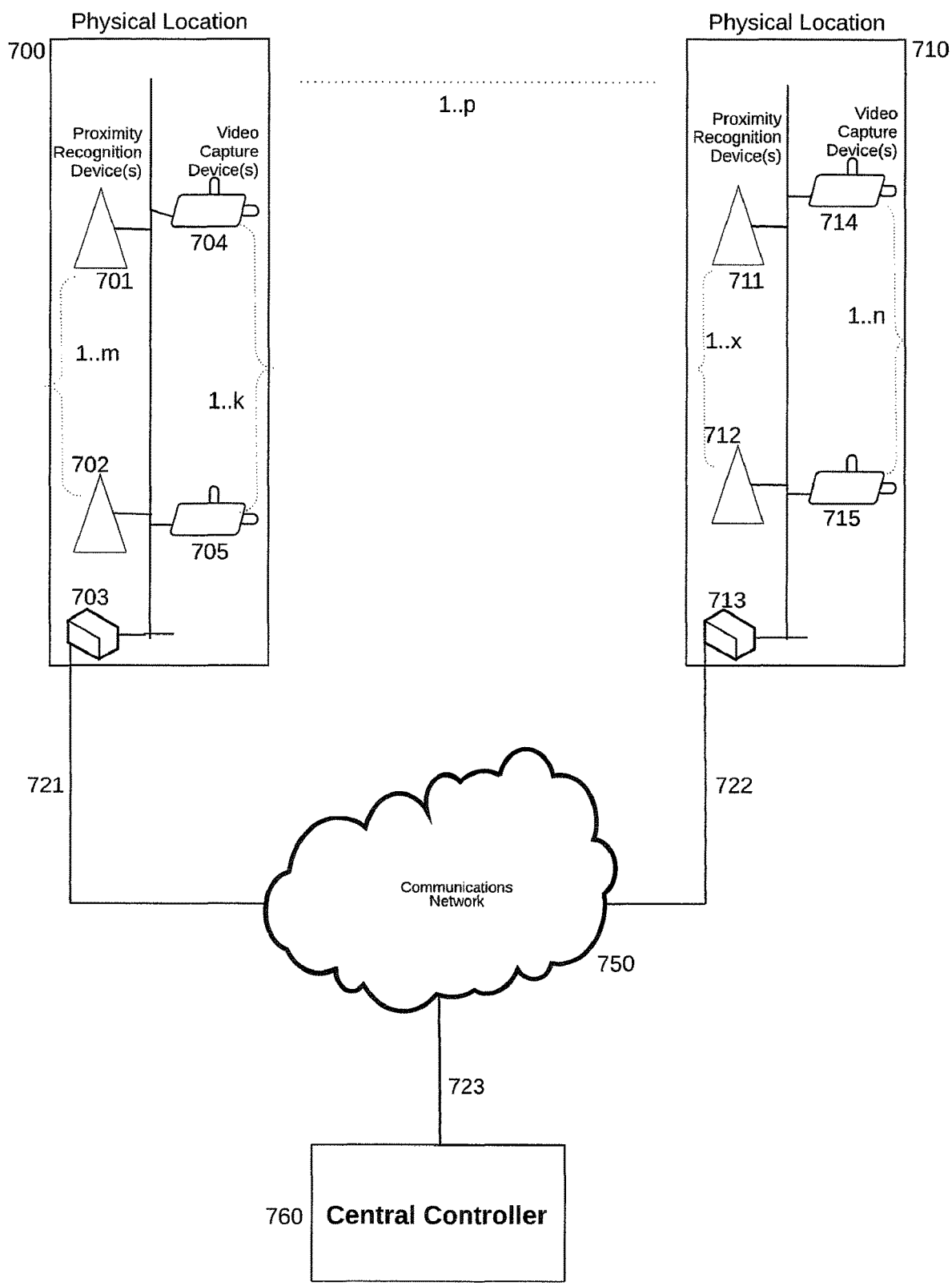
FIG. 7 is an architecture drawing of a multi venue distributed enhanced video system (EVS) including PRD units, VCD units and a central controller.

With reference to FIG. 7, an architecture drawing of a multi venue distributed enhanced video system (EVS) including PRD units, VCD units and a central controller is shown.

Central Controller 760 is connected to one or more venues 700, 710 by communications network 750 through communications interface 723. Communications interface 723 comprises one or some combination of cable modems, DSL, DS1, DS3, Ethernet, fiber optic, or some other future wired connectivity as well as WiFi 802.11 or Long Term Evolution (LTE) or some other current or future wireless technology in a manner well known to those skilled in the area of communications technology.

Within the exemplary venue 700, one or more video capture devices PRDs 704, 705 are deployed in a manner designed to provide appropriate visibility of required physical spaces within venue 700.

One or more proximity recognition devices PRDs 701, 702 are also deployed within venue 700 in a manner designed to provide appropriate detection of wirelessly communicating mobile devices within venue 700.

Proximity recognition devices PROs 701, 702 within venue 700, as well as Proximity recognition devices PRDs 711 and 712 within venue 710 are connected to communications network 750 through communications interfaces 721 and 722 respectively, as previously described. In one embodiment, PRDs 701, 702, for example, may be coupled to the communications infrastructure of venue 700 and communicate to communications network 750 through the venue's primary and possible back up communications interfaces 721 through some communications gateway 703 (with communications interface 722 and communications gateway 713 performing corresponding functions for PROs 711, 713 within venue 710).

Video capture devices VCDs 704, 705 within venue 700, as well as video capture devices PRDs 714 and 715 within venue 710 are connected to communications network 750 through communications interfaces 721 and 722 respectively, as previously described. In one embodiment, VCDs 705, 704, for example, may be coupled to the communications infrastructure of venue 700 and communicate to communications network 750 through the venue's primary and possible back up communications interfaces 721 through some communications and/or application services gateway 703 (with communications interface 722 and communications/applications services gateway 713 performing corresponding functions for VCDs 711, 713 within venue 710). In an example embodiment, video storage and/or video analysis functionality may be deployed at the venue for efficiency purposes within devices 703 and 713.

Central Controller 760 of the proximity recognition system PRS receives information from each of the proximity recognition device PRDs configured to send information to Central Controller 760.

In various embodiments, each PRO can send information to one or a plurality of central controller instances 760 for redundancy or information partitioning reasons.

Figure 8:
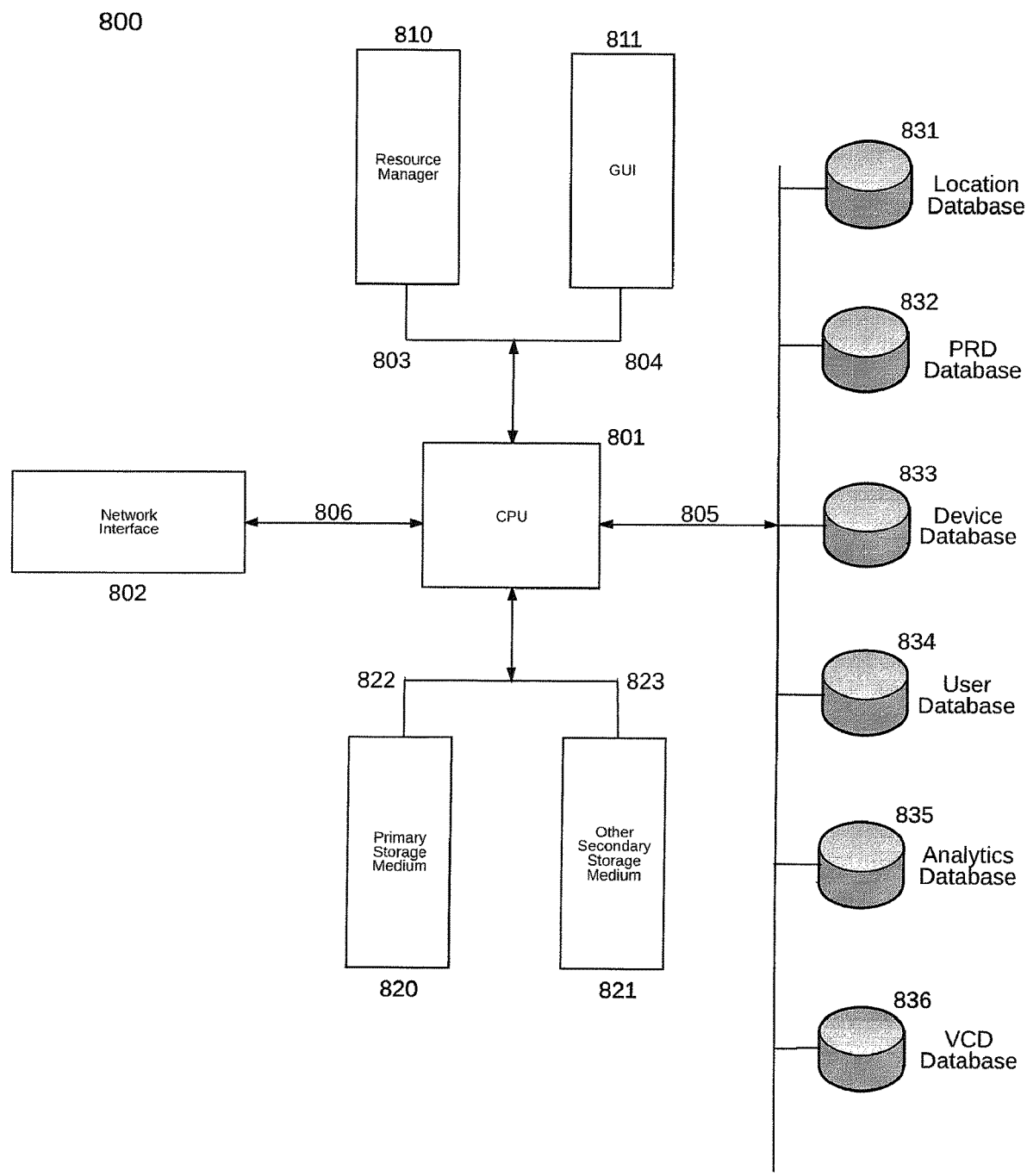
FIG. 8 is a block diagram of the EVS central controller.

With reference to FIG. 8, the architecture of a typical embodiment of central controller 800 of the enhanced video system is depicted in accordance with the definitions provided above.

Central controller 800 includes one or more central processing units (CPU) 801 to execute instructions which are delivered or installed electronically (software) to central controller 800 such as a server program to manage the operation of system. Primary storage mechanism 820 is coupled to CPU 801 by interface 822 and is used to temporarily store instructions as well as to input and output data. CPU or CPU complex 801 is also coupled by interface 823 to other secondary storage medium 821 which is used to store information permanently even when central controller 800 is not powered. Information can include instructions and relevant information such as operational state data as well as configuration parameters.

For the purposes of system administration including system activity and status review, capacity optimization, or system configuration among other functions, graphic user interface (GUI) 811 of some form is optionally provided that connects with CPU 801 directly via local connectivity 804 or optionally via Network Interface 802. Optionally, Resource Manager 810 is connected to CPU 801 directly or via local connectivity 803 or optionally via Network interface 802. Exemplary Resource Manager 810 entities that are commercially available include Splunk Enterprise and Hewlett Packard's Network Management Center product.

CPU complex 801 is also coupled by interface 805 to databases used to persistently store information about the status of the proximity recognition system PRS overall. Database 831 stores information about the venues registered with central controller 800 including some optimal combination of their name, contact information, security credentials, street address, global address expressed in latitude and longitude and possible site specific information. Database 832 stores information about the proximity recognition devices (PRDs) known to central controller 800 including some optimal combination of their name, communications and/or IP address, assigned venue, location within the venue, previously assigned venues, contact information, security credentials, and possible biometric information. Database 833 stores information about the mobile devices known to the instance of central controller 800 including some optimal combination of device identifier, venue appearance history as well as other possible device specific analytics information. Database 834 stores information about users registered with this instance of central controller 800 including name, user name, email address, company, venue access list, PRD access list, operational privilege list, account maintenance information, biometrics information, audit trail and possible security credentials. Database 835 stores information about analytics information awarded including some optimal combination of their venue summarization, device summarization, time of day, week, or month summarization, other historical data summarization or other forms of analytical calculation, date, time, customer identifier, merchant identifier, third party beneficiary identifier, transaction identifier, and possible security credentials. Database 836 stores information about the video capture devices (VCDs) known to central controller 800 including image information received the VCDs as well as some optimal combination of their name, communications and/or IP address, assigned venue, location within the venue, view orientation, view angle and field of view parameters, previously assigned venues, contact information, security credentials, and possible biometric information. Location information in databases 832 and 836 would use the same coordinate system.

Databases 831, 832, 833, 834, 835, and 836 and other Secondary Storage Medium 821 are connected and configured for optimal systems operation in a manner well known to those skilled in the area of information systems and database technology.

Central controller 800 and in particular CPU 801, is also coupled via interface 806 to communications Network interface 802 to communications network 750 as in FIG. 7 in a manner well known to those skilled in the area of information systems and communications technology.

Figure 9:
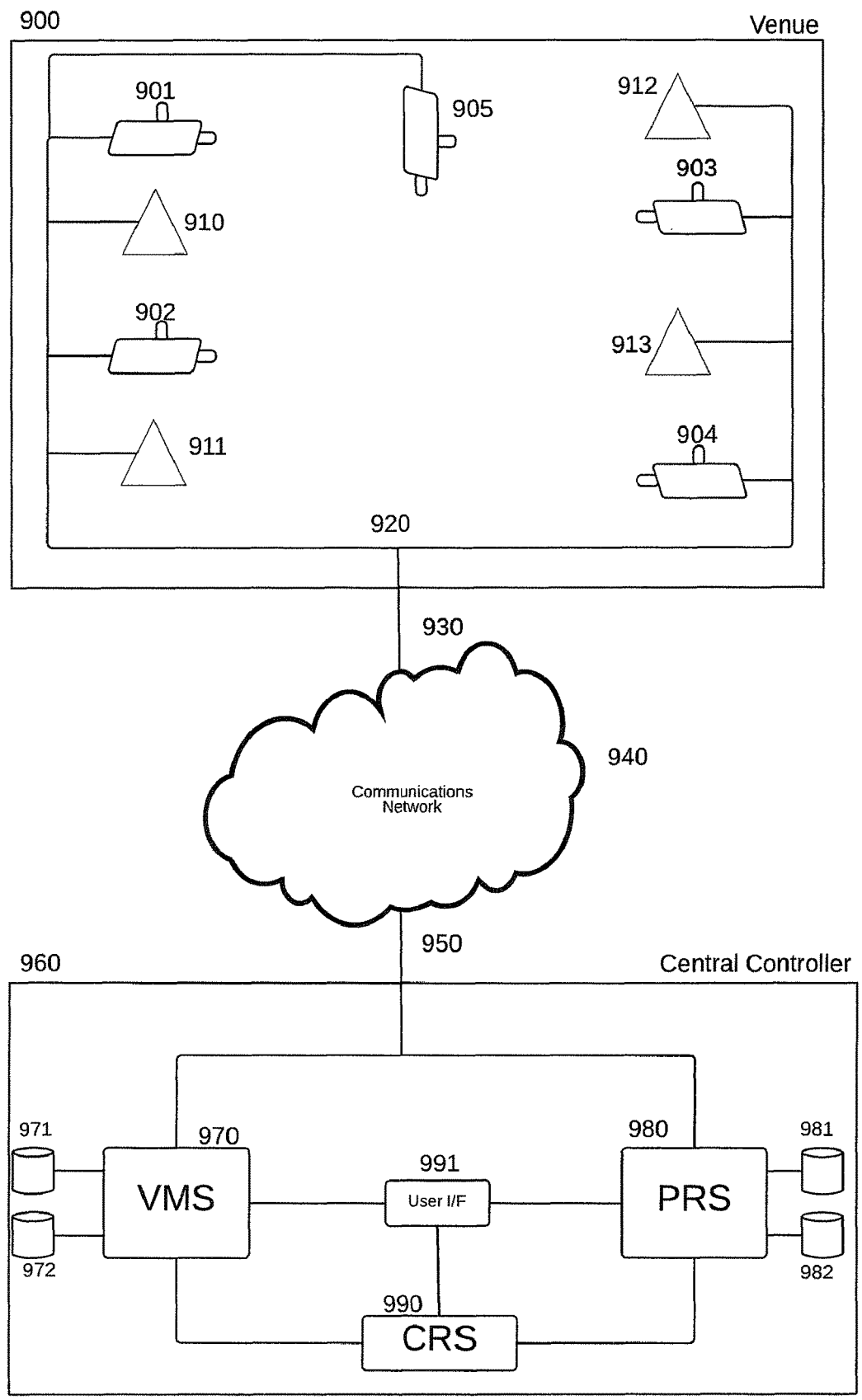
FIG. 9 is an alternative architecture of the EVS which separates the video management subsystem VMS and the PRS subsystems.

With reference to FIG. 9, an alternative architecture of a typical embodiment of the enhanced video system is depicted.

In this embodiment, VCDs 901, 902, 903, 904, 905 and PROs 910, 911, 912, 913, deployed at one or more venues 900, report to a Central controller 960. The PRD and VCD elements at depicted venue 900 report to the Central Controller 960 over some form of communications network 940 using pre-existing venue communications infrastructure 920 or new communications infrastructure for the EVS. This venue communications infrastructure is connected to communications network 940 using some form of wired or wireless such as cellular communications.

The Central Controller 960 is attached to the communications network 940 using some form of communications interface 950. The Central Controller 960 of the Enhanced Video System (EVS) in this example embodiment includes a Video Management Subsystem (VMS) 970, a Proximity Recognition Subsystem (PRS) 980, and a Cross Reference Subsystem (CRS) 990 as well as a user interface module 991.

The VMS subsystem 970 received and processes video image information from the VCDs 901, 902, 903, 904, 905. The VMS subsystem has various databases 971, 972 attached. These databases enable storage, analysis, and management of image information as well as analytics information derived from the received image information. The VMS subsystem 970, in this example embodiment, is designed to operate in a standalone fashion and may be deployed in advance of other EVS subsystems.

The PRS subsystem 980 received and processes presence information from PRDs 910, 911, 912, 9134 associated with wirelessly communicating mobile devices arriving at, moving through, and leaving venue 900. The PRS subsystem 980 has various databases 981, 982 attached. These databases enable storage, analysis, and management of mobile device presence information as well as mobile device location information derived from received mobile device presence information. The PRS subsystem 980, in this example embodiment, is designed to operate in a standalone fashion and may be deployed in advance of other EVS subsystems.

The CRS subsystem 990 interacts with VMS and the PRS subsystem 980 over established application programming interfaces (APIs) to receive and/or retrieve VCD and associated image information from the VMS and to receive and/or retrieve PRD and associated mobile device presence and location information from the PRS.

The CRS subsystem 990 utilizes VCD and PRD location information as well as VCD orientation and other field of view information to enable cross referencing of three-dimensional location information derived by the PRS subsystem for the mobile devices in the venue with the three dimensional fields of view of VCDs deployed in the venue using well known mathematical algorithms as previously described. Various embodiments of this cross referencing task are possible. In one envisioned embodiment, the relatively static nature of PRO and VCD deployments would be exploited to do a substantial amount of pre-calculation to enable the efficient cross reference analysis of image and associated field of view to mobile devices determined to be in the field of view at the image's specific instant in time and vice versa. Once this cross reference analysis is completed, the behavior of the mobile devices of interest (DoIs) can determined using information stored in database 835 depending on the embodiment of EVS. Once this augmentation data is gathered, the specific image can be augmented to provide an enhanced understanding of the users associated with the mobile devices of interest. This image augmentation data can include information regarding frequency of visit, time of arrival, time on site, entrance of arrival, other information regarding areas of the venue visited on this or previous visits to the venue, determined association with other mobile devices during this or previous visits, or some calculated score associated with threat level or other measure of interest possibly using information external to the EVS.

Figure 10:
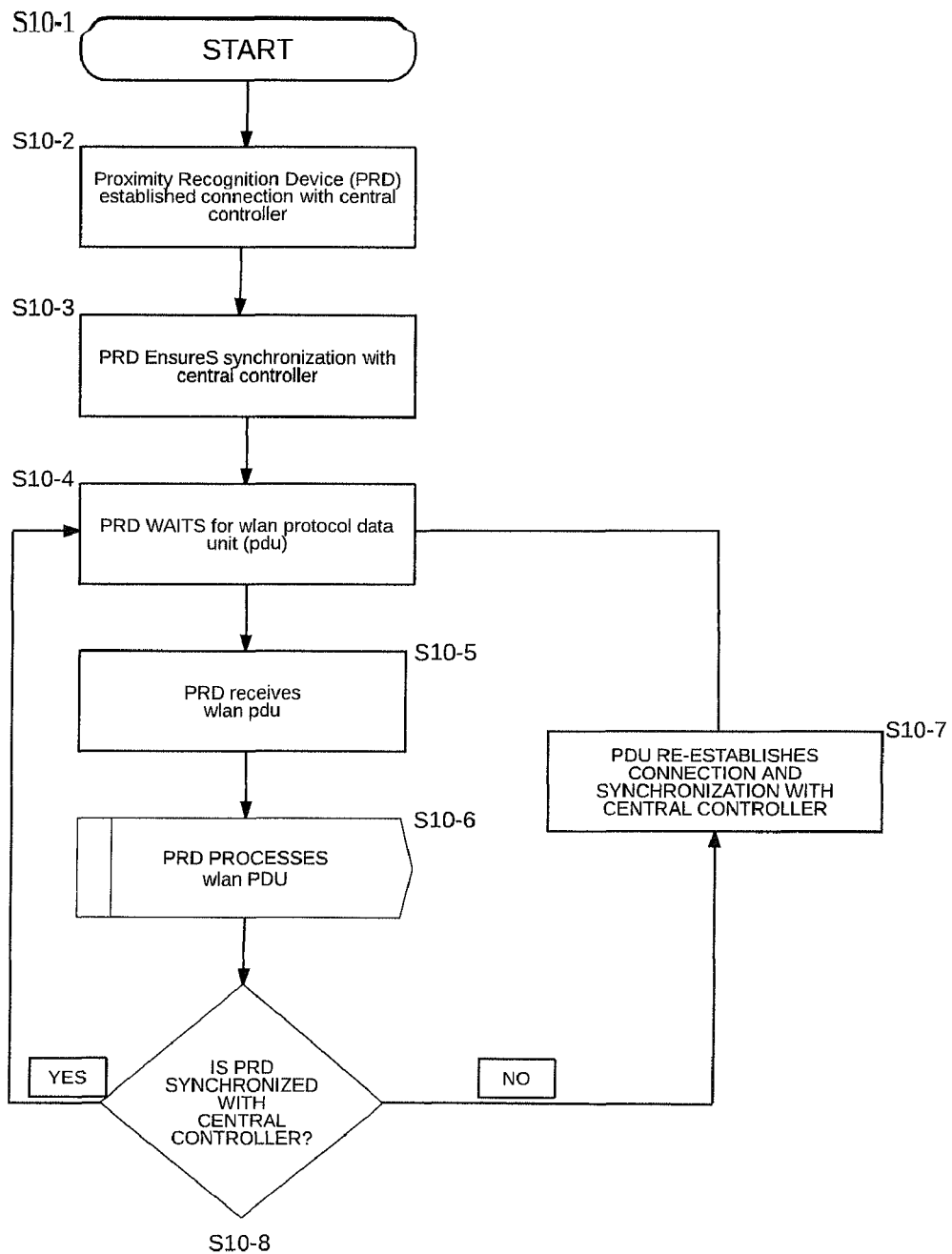
FIG. 10 is a logic diagram illustrating the process of a proximity recognition device (PRD) operating in a venue.

With reference to FIG. 10, a flowchart describing the steps performed by the proximity recognition device PRO upon system start is depicted. In various embodiments, the PRD starts and becomes fully operational when power is applied or when certain time parameters are met (such as time of day, for example). Processing starts at step S10-1 and immediately proceeds to Step S10-2 in which the PRD establishes a connection with Central Controller.

Once connectivity has been established with Central Controller, certain information including time synchronization, is established at Step S10-3.

Proceeding to Step S10-4, the PRO waits to receive a wireless protocol data unit (PDU) using an antenna and wireless transceiver from wirelessly communicating mobile devices in the vicinity of the PRD.

When a PDU has been received at Step S10-5, the PRD proceeds to Step S10-6 in which the PDU is processed according to certain rules and instructions that have been delivered to the PRD. An example embodiment of PDU processing is described in FIG. 8.

After processing the received PDU, the PRO proceeds to Step S10-8 where the status of the PRD's synchronization with Central Controller is checked. If the PRD is synchronized with Central Controller, it returns to Step S10-4 and waits for another PDU to arrive from mobile devices within range of the PRO's antenna and wireless transceiver.

At Step S10-8, if the PRD determines it is not synchronized with the central controller, the PRD proceeds to Step S10-7 where the PRD attempts to re-establish connection and synchronization with Central Controller.

In view of the foregoing discussions pertaining to the flowchart illustrated in FIG. 10, it is understood that such a system enables venue operators to better understand the behavior of venue visitors, customers and potential customers equipped with wirelessly communicating mobile devices in new ways not heretofore possible.

While this invention is described in an embodiment with reference to WiFi, the principles of this invention are easily applicable (by an average person skilled in the art) to other, short range communications protocols (including, but not limited to, Bluetooth (IEEE 802.15.1-2002/2005), Active RFID, WiMax, LTE (Long Term Evolution).

Figure 11:
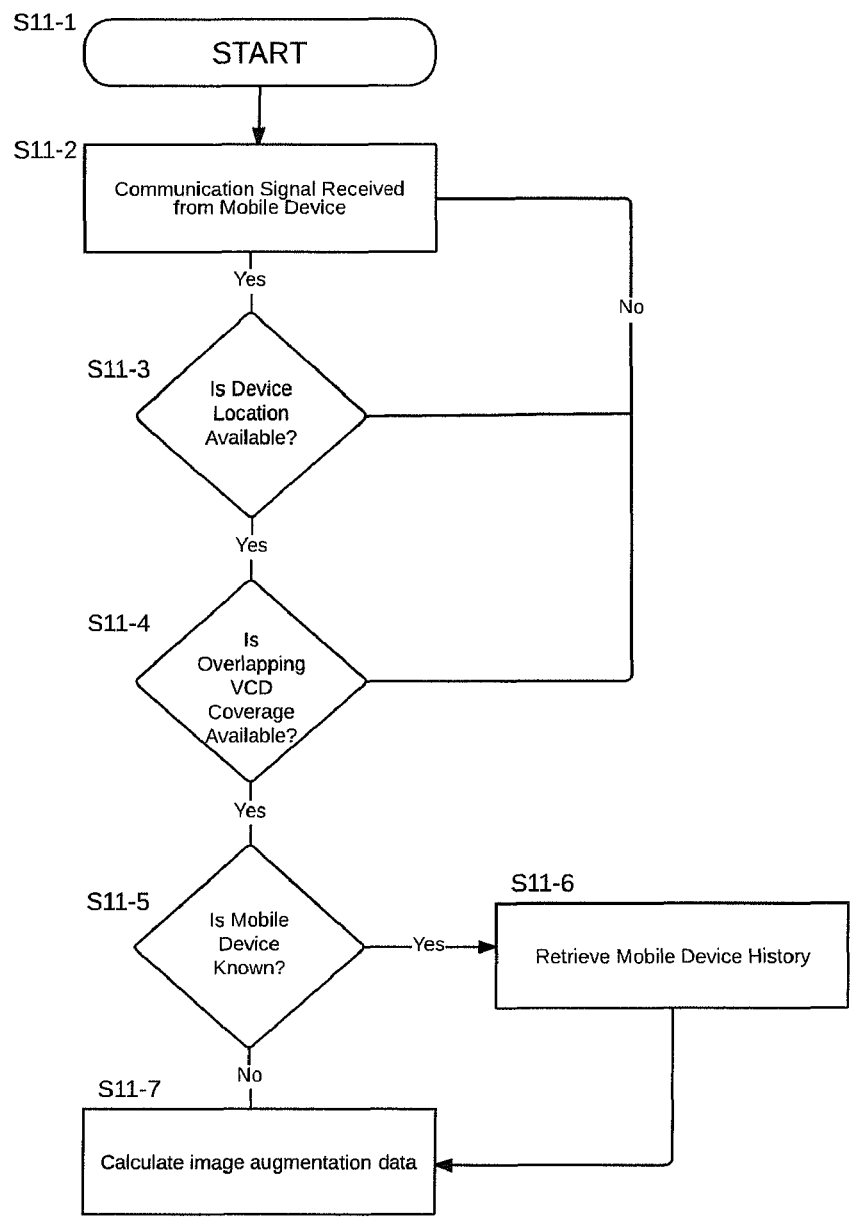
FIG. 11 is a logic diagram illustrating the process of an EVS using information received from associated proximity recognition devices (PRDs) operating in a venue in conjunction with image information received from the VCDs deployed within the venue to calculation image augmentation data.

With reference to FIG. 11, a is a logic diagram illustrating the process of an EVS using information received from associated proximity recognition devices (PRDs) operating in a venue in conjunction with image information received from the VCDs deployed within the venue to calculation image augmentation data.

In various embodiments, the process starts at Step S11-1 when the Central Controller 800 starts and then proceeds to Step S11-2 to wait to receive information from a one or more PROs regarding the presence of a mobile device detected within the venue as a result of a communications signal being received.

When a communication signal is received and the PRO reports this to the Central Controller 800, 960, the EVS proceeds to Step S11-3. In this Step, the EVS determines if location data is available for the identified mobile device. Various embodiments exist for this determination. Depending on the embodiment, standard trilateration, triangulation, time of flight, or some combination of these or other location calculation techniques may be utilized to determine the location of the mobile device with the venue. Typically, depending on the location calculation technique, the communications signal from the mobile device must be detected by three or more PRDs deployed in the venue.

If location information is not available for the mobile device associated with the received communications signal, then EVS process returns to the Step S11-2 to await additional mobile device presence reports. If location information is available for the mobile device associated with the received communications signal, then EVS proceeds to Step S11-4. In Step 11-4, the EVS determines if the location of the associated mobile device is covered by one or more VCDs. Various mathematic techniques are well known for this cross referencing of location and may be used to accomplish this task.

If overlapping VCD information is not available for the location of the mobile device associated with the received communications signal, then EVS process returns to the Step S11-2 to await additional mobile device presence reports. If overlapping VCD coverage is determined to be available for the mobile device associated with the received communications signal, then EVS proceeds to Step S11-5. In Step 11-5, the EVS determines if the associated mobile device is known to the EVS.

If the EVS views the associated mobile device as known, then it proceeds to Step S11-6 retrieve its history within the venue as well as any associated venues. This history can include information about previous venue visit history associated with the mobile device, arrival time, dwell time at the venue during this and/or previous visits, possible movement within a group of people, group detail such as size of group as well as information about the mobile device's path through the venue during this and/or previous visits.

Regardless of the availability of history information for associated mobile device, the EVS in this scenario proceeds to calculate image augmentation data as described previously.

Figure 12:
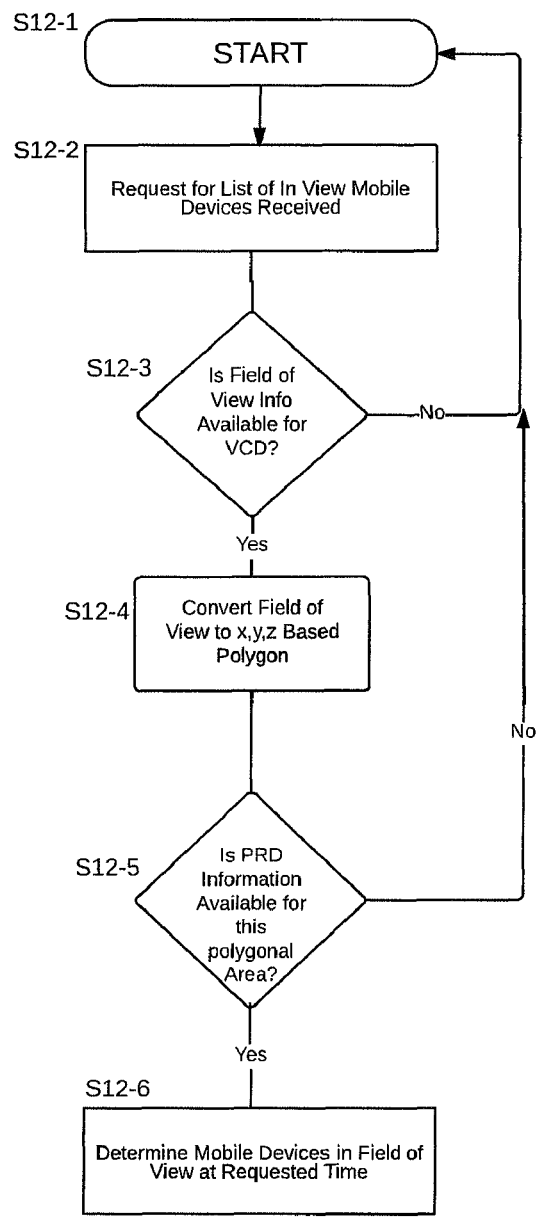
FIG. 12 is a logic diagram illustrating the process of an EVS using an image received from a VCD deployed in a venue and its implied field of view at a specific time along with information received from PRDs in the same venue to determine all of the mobile devices within the VCD's field of view at the specific time of interest as well as the movement and other behavioral information associated with the determined set of mobile devices.

With reference to FIG. 12, a is a logic diagram illustrating the process of an EVS processing user or external system request for a list of identifiers for mobile device determined to be in a given VCD's field of view at a specific instant in time.

In this process, the Central Controller of the EVS is waiting at Step12-1 for requests.

In various embodiments, the process starts at Step S12-2 when the Central Controller 800 receives a request for "In View" ie. in the field of view of a given VCD at a specific instant in time.

The process proceeds to Step S12-3, when the EVS determines if it has required VCD field of view information to service the received request.

If the EVS does not have the required VCD field of view information to service the received request, processing returns to Step S12-1 to await another request. In the event the EVS does have the required VCD field of view information to service the received request, processing continues to Step S12-4 where the field of view of the associated VCD is converted into a two or three dimensional based polygon. Various embodiments of this step exist. As previously indicated, the relatively static nature of VCD deployments can be exploited to do a substantial amount of pre-calculation of this two or three dimensionally based polygon.

The process then proceeds to Step12-5, where a determination is made regarding the availability of mobile device location information based on PRD reporting. Various algorithms exist for cross referencing or determining the two or three-dimensional intersection of the polygon representing the VCD of interest's field of view and with the PRD coverage within the venue as previously described, as approximated by polygon(s).

If PRO information is not available for the specified VCD's field of view, then processing returns to Step S12-1. If PRD information is available for the specified VCD's field of view, then for this envisioned process of EVS, the list of mobile devices known to be in the field of view of the VCD of interest is produced and made available to the requesting entity.

Figure 13:
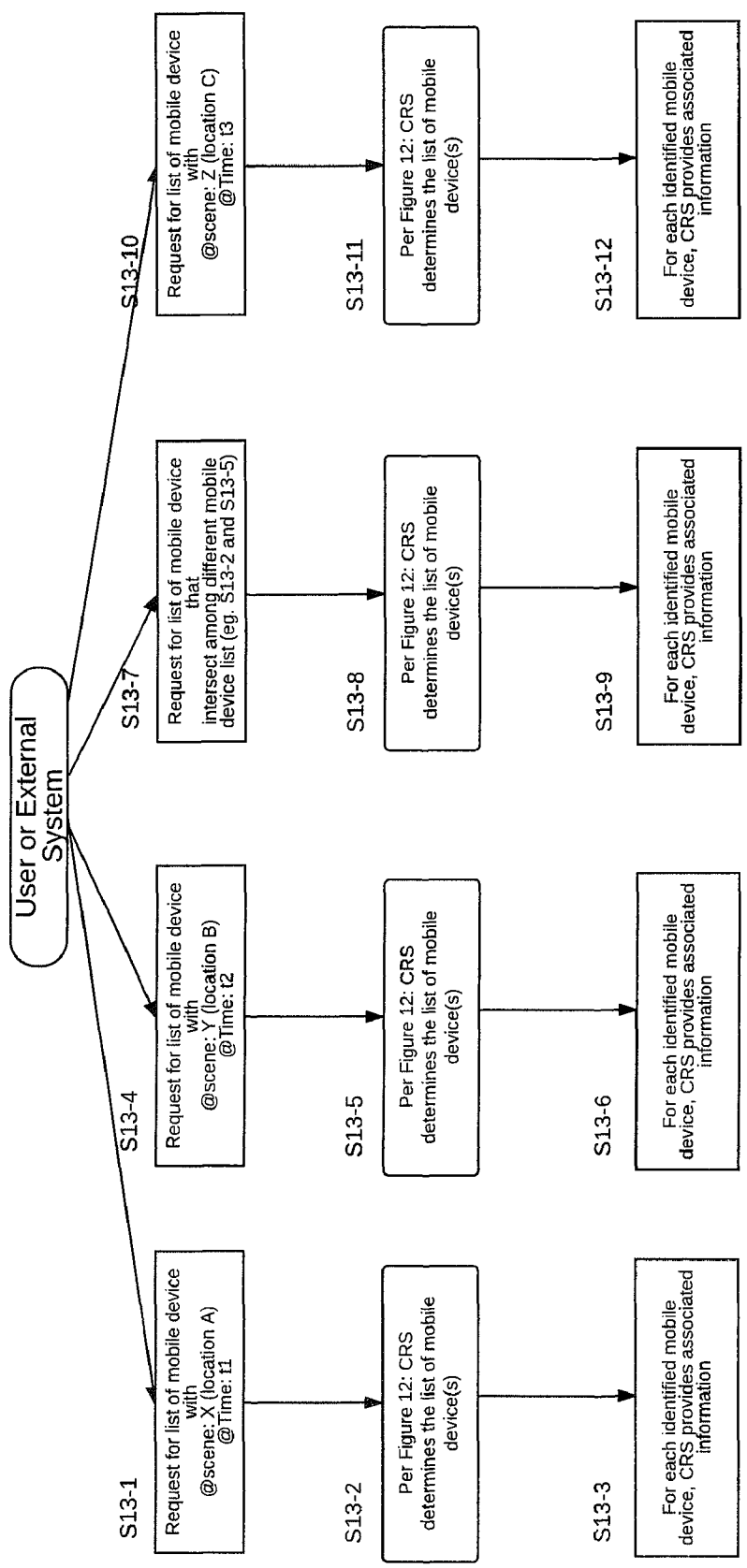
FIG. 13 is a logic diagram illustrating the process of an EVS using an image received from a VCD deployed in a venue and its associated field of view at a specific time along with other instances of images received from the same or different VCDs deployed in a venue and their associated fields of view at different instances in time along with information received from PRDs in the same venue to determine all of the mobile devices expected to be in all or some subset of the supplied VCD fields of view at the specified associated times of interest as well as the movement and other behavioral information associated with the determined set of mobile devices.

With reference to FIG. 13, a sample operation scenario illustrating the process of an EVS processing a user or external system request to determine the venue visiting (location) history and related video scenes or fields of view of the specific mobile device(s).

An external request is received by interface module 991 for a list of identifiers for mobile device with a parameter set (S13-1).

Cross Reference Subsystem (CRS) 990 determines the list of mobile devices to be in a VCD's field of view (@Location A) at Time t1 as described in FIG. 12 (S13-2).

For each identified mobile devices, CRS 900 retrieves its venue visit history with timeline and corresponding location(s) and video scene(s)/VCD field(s) of view. (S13-3)

Another external request is received by interface module 991 for a list of identifiers for mobile device with a parameter set (S13-4).

CRS 990 determines the list of mobile devices in a VCD's field of view (@Location B) at Time t2 as described in FIG. 12 (S13-5).

For each identified mobile device, CRS 900 retrieves its venue visit history with timeline and corresponding location(s) and video scene(s)/VCD field(s) of view (S13-6)

Another external request is received by interface module 991 to find the common mobile device list between the previous requests (eg. S13-2 and S13-5). S13-7

CRC 900 determines the list of mobile devices that are common (intersecting) between the previous two requests (S13-2 and S13-5). (S13-8)

For each identified mobile device, CRS 900 retrieves its venue visit history with timeline and corresponding location(s) and video scene(s)/VCD field(s) of view. For example, the EVS can provide a video scene (field of view) that includes the specific wireless device @Location D at Time t10. (S13-9)

For some applications, the objective is to have a small number of common mobile devices (eg. down to 1 specific mobile device). Based on the result from S13-8, another external request may be received by interface module 991 for a list of identifiers for mobile device with another parameter set (S13-10, S13-11, S13-12).

And then another external request is received by interface module 991 to find the common mobile device list between the previous requests (eg. S13-2, S13-5, and S13-11). (S13-7)

CRC 900 determines the list of mobile devices that is common (intersecting) between the previous three requests (S13-2, S13-5, and S13-11). (S13-8)

The process of S13-10, S13-11, S13-12 follows by S13-7, S13-8, S13-9 may be carried out in multiple iterations until the desired mobile device is determined. In S13-7, different list of mobile devices may be requested by the user, eg. Intersect of S13-2 and S13-5 or intersect of S13-2, S13-5, S13-11.

Figure 4:
FIG. 4 is a sample depiction of image information along with information about objects detected in the scene or practical field of view of a VCD. This object information may be generated by the VCD itself or some external device that has access to the series of images produced by the VCD.

With reference to FIG. 4, a sample collection of video image search output is shown with example information specifying the location of the scene or VCD where the image was captured along with the time the image was captured as well as information regarding the one or more objects in the scene of the VCD field of view. This example collection of images and associated information could be generated by the EVS given an image of interest. This object information is referred to in the FIG. 4 as "Pattern". This pattern information for example could indicate the appearance in the scene of a single person, with male sex, approximate height of six feet, wearing purple pants. More sophisticated examples of object information associated with overall image information are well known.

Based on this object information and associated "patterns", either a human or a computer could determine high probability matches between images based on a commonality of patterns through various techniques and algorithms.

These high probability matches could be used to determine mobile device commonality as described in FIG. 4 to increase or decrease the confidence of the match of the image with the original image of interest. This process can be repeated across all images identified by the video image search process to increase or decrease the confidence of the match with the original image of interest. Through some algorithm this confidence could be used to modify the video search output or results associated with the original image of interest.

Accordingly, while this invention has been described with reference to the illustrative embodiments, this description is not intended to be construed in any limiting sense. Various modifications of the illustrative embodiments, as well as other embodiments of the invention, will be apparent to persons skilled in the art upon reference to this description. It is therefore contemplated that any future patent claims will cover any such modifications or embodiments which falls within the scope of the invention. In particular, regardless of how the location information of visiting wireless mobile devices was obtained, the principles of this invention are applicable. What this invention teaches is that enhancement of video systems using wireless device proximity detection. The proximity of a device communicating wirelessly is sensed and cross referenced with received video image information. Through time, movement of wirelessly communicating mobile devices through a venue or set of venues can be deduced and additionally cross referenced to and augmented over image data from the set of video capture devices.

The invention claimed is:

1. One or more tangible, non-transitory, machine-readable media storing instructions that when executed by one or more processors effectuate operations comprising:
   determining, with a computer system, that a first mobile device is present at a first location in a venue based on a signal of the first mobile device received by a proximity recognition device at a first time point, wherein the proximity recognition device is configured to observe, using an antenna of and wireless transceiver of the proximity recognition device, communication signals between wirelessly communicating mobile devices and cause, based on the communication signals, locations of the wirelessly communicating mobile devices to be determined;
   selecting, with the computer system, a first image captured by a first camera associated with the first location, wherein a field of view of the first camera spatially overlaps with an antenna range of the proximity recognition device, and wherein the first camera is one of a plurality of cameras;
   detecting, with the computer system, a first person depicted in the first image based on both the first image and the first location determined based on the signal of the first mobile device received by the proximity recognition device;
   associating, with the computer system, in response to detecting the first person, the first person with the first mobile device;
   determining, with the computer system, a first set of visual attributes associated with the first person based on the first image, wherein the first set of visual attributes is indicative of a first height of the first person and a first color visually associated with the first person;
   detecting, with the computer system, a second person positioned at a second location in the venue at a second time point based on a second image captured by a second camera of the plurality of cameras;
   determining, with the computer system, a second set of visual attributes associated with the second person based on the second image, wherein the second set of visual attributes is indicative of a second height of the second person and a second color visually associated with the second person;
   determining, with the computer system, a match probability based on the first set of visual attributes and the second set of visual attributes;
   determining, with the computer system, whether the match probability satisfies a confidence threshold; and
   in response to a determination that the match probability satisfies the confidence threshold, storing, with the computer system, an indication of a match between the second person and the first person in memory.

2. The one or more media of claim 1, wherein the proximity recognition device is a first proximity recognition device, and wherein the operations further comprise:
   determining that the first mobile device is present at the second location based on a second signal of the first mobile device received b y a second proximity recognition device at the second time point;

determining a device path based on the first location, the first time point, the second location, and the second time point, wherein the device path includes a first position representing an arrival into the venue and a second position representing a departure from the venue; and
visually depicting the device path on a display system.

3. The one or more media of claim 1, the operations further comprising:
determining a two-dimensional shape based on the field of view;
determining whether the two-dimensional shape spatially overlaps with the first location; and
associating the first camera with the first location based on a determination that the two-dimensional shape spatially overlaps with the first location.

4. The one or more media of claim 1, the operations further comprising:
determining a three-dimensional shape based on the field of view;
determining whether the three-dimensional shape spatially overlaps with the first location using a three-dimensional polygonal intersection algorithm; and
associating the first camera with the first location based on a determination that the three-dimensional shape spatially overlap with the first location.

5. The one or more media of claim 1, wherein the match probability is a first match probability, the operations further comprising:
detecting a third person at the first time point based on a third image captured by a third camera of the plurality of cameras;
determining a third set of visual attributes associated with the third person based on the third image, wherein the third set of visual attributes is indicative of a third height of the third person and a third color visually associated with the third person;
determining a second match probability based on the first set of visual attributes and the third set of visual attributes;
determining whether the second match probability satisfies the confidence threshold;
in response to a determination that the second match probability satisfies the confidence threshold, associating the third person with the first person and the second person.

6. The one or more media of claim 1, the operations further comprising causing a display system to display an augmented version of the second image, wherein the augmented version of the second image comprises a visual display of the first time point.

7. The one or more media of claim 1, wherein the proximity recognition device is a first proximity recognition device, and wherein the first proximity recognition device is located at a first proximity device position, and wherein the operations further comprise:
detecting the first mobile device with a second proximity recognition device at the first time point, wherein the second proximity recognition device is located at a second proximity device position;
detecting the first mobile device with a third proximity recognition device at the first time point, wherein the third proximity recognition device is located at a third proximity device position; and
determining the first location based on the first proximity device position, the second proximity device position, and the third proximity device position.

8. The one or more media of claim 1, the operations further comprising:
receiving a device orientation of the first camera and a device position of the first camera; and
determining the field of view of the first camera based on the device orientation and the device position.

9. The one or more media of claim 1, the operations further comprising:
determining that the first mobile device is present at a third location at a third time point using an additional proximity recognition device;
capturing a third image of the third location using the second camera;
determining that a person associated with the first mobile device is not captured by the third image due to an obstruction; and
determining a device path, wherein the device path comprises the first location, the first time point, the second location, the second time point, the third location, and the third time point.

10. The one or more media of claim 1, the operations further comprising:
determining an association set of visual attributes between the first mobile device and a second mobile device based on the first image;
detecting the second mobile device at a third location at a third time point using a second proximity recognition device, wherein the first mobile device is not detected at the third location at the third time point; and
determining a device path, wherein the device path comprises the first location, the first time point, the second location, the second time point, the third location, and the third time point.

11. The one or more media of claim 1, the operations further comprising:
determining whether the first mobile device is in a list of known devices; and
in response to a determination that the first mobile device is in the list of known devices, retrieving a history of the first mobile device; and
visually display a value of the history of the first mobile device.

12. The one or more media of claim 11, wherein:
the history of the first mobile device comprises a count of a group of people, wherein the first mobile device was determined to have moved within the group of people in a previous visit; and
visually displaying the value of the history of the first mobile device comprises visually displaying the count of the group of people.

13. The one or more media of claim 1, wherein the signal is a wireless local area network signal, IEEE 802.15.1-2002/ 2005 signal, Active RFID signal, WiMax signal, or Long Term Evolution signal.

14. The one or more media of claim 1, wherein the field of view is a first field of view, and wherein the operations further comprise:
determining a first set of mobile devices detected at the first location, wherein the first set of mobile devices comprises the first mobile device;
determining a second set of mobile devices detected at the second location, wherein the second set of mobile devices comprises the first mobile device; and
determining a third set of mobile devices based on which devices are in both the first set of mobile devices and the second set of mobile devices, wherein the third set of mobile devices comprises the first mobile device.

15. The one or more media of claim 1, wherein:
the first mobile device is one of a plurality of mobile devices;
the signal is one of a first plurality of signals;
the first person is one of a plurality of physically different persons; and
the operations further comprise:
  determining that the plurality of mobile devices is present at the first location based on the first plurality of signals received by the proximity recognition device at the first time point;
  detecting the plurality of physically different persons depicted in the first image based on the first image, wherein the plurality of physically different persons is determined to be a group;
  detecting that the plurality of mobile devices is at the second location based a second set of signals received by a second proximity recognition device at the second time point; and
  generating an alert indicating that the group has arrived at the venue.

16. The one or more media of claim 1, further comprising determining the first location based on a trilateration computation, a triangulation computation, or a time of flight computation.

17. The one or more media of claim 1, wherein the first image is associated with a set of values defining the field of view captured by the first image.

18. The one or more media of claim 1, the operations further comprising displaying a future time point associated with a future visit of the first mobile device to the venue, wherein the future time point occurs after the first mobile device is determined to have departed from the venue.

19. The one or more media of claim 1, wherein determining that the first mobile device is present at the first location comprises:
  changing a signal strength threshold of the proximity recognition device;
  determining whether a signal strength of the signal satisfies the signal strength threshold; and
  in response to a determination that the signal strength satisfies the signal strength threshold, determine the first mobile device is present at the first location.

20. A method comprising:
  determining, with a computer system, that a first mobile device is present at a first location in a venue based on a signal of the first mobile device received by a proximity recognition device at a first time point, wherein the proximity recognition device is configured to observe, using an antenna of and wireless transceiver of the proximity recognition device, communication signals between wirelessly communicating mobile devices and cause, based on the communication signals, locations of the wirelessly communicating mobile devices to be determined;
  selecting, with the computer system, a first image captured by a first camera associated with the first location, wherein a field of view of the first camera spatially overlaps with an antenna range of the proximity recognition device, and wherein the first camera is one of a plurality of cameras;
  detecting, with the computer system, a first person depicted in the first image based on both the first image and the first location determined based on the signal of the first mobile device received by the proximity recognition device;
  associating, with the computer system, in response to detecting the first person, the first person with the first mobile device;
  determining, with the computer system, a first set of visual attributes associated with the first person based on the first image, wherein the first set of visual attributes is indicative of a first height of the first person and a first color visually associated with the first person;
  detecting, with the computer system, a second person positioned at a second location in the venue at a second time point based on a second image captured by a second camera of the plurality of cameras;
  determining, with the computer system, a second set of visual attributes associated with the second person based on the second image, wherein the second set of visual attributes is indicative of a second height of the second person and a second color visually associated with the second person;
  determining, with the computer system, a match probability based on the first set of visual attributes and the second set of visual attributes;
  determining, with the computer system, whether the match probability satisfies a confidence threshold; and
  in response to a determination that the match probability satisfies the confidence threshold, storing, with the computer system, an indication of a match between the second person and the first person in memory.

21. The method of claim 20, wherein the proximity recognition device is a first proximity recognition device, and further comprising:
  determining that the first mobile device is present at the second location based on a second signal of the first mobile device received by a second proximity recognition device at the second time point;
  determining a device path based on the first location, the first time point, the second location, and the second time point, wherein the device path includes a first position representing an arrival into the venue and a second position representing a departure from the venue; and
  visually depicting the device path on a display system.

22. The method of claim 20, further comprising:
  determining a two-dimensional shape based on the field of view;
  determining whether the two-dimensional shape spatially overlaps with the first location; and
  associating the first camera with the first location based on a determination that the two-dimensional shape spatially overlaps with the first location.

23. The method of claim 20, further comprising:
  determining a three-dimensional shape based on the field of view;
  determining whether the three-dimensional shape spatially overlaps with the first location using a three-dimensional polygonal intersection algorithm; and
  associating the first camera with the first location based on a determination that the three-dimensional shape spatially overlap with the first location.

24. The method of claim 20, wherein the match probability is a first match probability, and further comprising:
  detecting a third person at the first time point based on a third image captured by a third camera of the plurality of cameras;
  determining a third set of visual attributes associated with the third person based on the third image, wherein the third set of visual attributes is indicative of a third height of the third person and a third color visually associated with the third person;
determining a second match probability based on the first set of visual attributes and the third set of visual attributes;
determining whether the second match probability satisfies the confidence threshold;
in response to a determination that the second match probability satisfies the confidence threshold, associating the third person with the first person and the second person.

25. The method of claim 20, further comprising:
causing a display system to display an augmented version of the second image, wherein the augmented version of the second image comprises a visual display of the first time point.

26. The method of claim 20, wherein the proximity recognition device is a first proximity recognition device, and wherein the first proximity recognition device is located at a first proximity device position, and further comprising:
detecting the first mobile device with a second proximity recognition device at the first time point, wherein the second proximity recognition device is located at a second proximity device position;
detecting the first mobile device with a third proximity recognition device at the first time point, wherein the third proximity recognition device is located at a third proximity device position; and
determining the first location based on the first proximity device position, the second proximity device position, and the third proximity device position.

27. The method of claim 20, further comprising:
receiving a device orientation of the first camera and a device position of the first camera; and
determining the field of view of the first camera based on the device orientation and the device position.

28. The method of claim 20, further comprising:
determining that the first mobile device is present at a third location at a third time point using an additional proximity recognition device;
capturing a third image of the third location using the second camera;
determining that a person associated with the first mobile device is not captured by the third image due to an obstruction; and
determining a device path, wherein the device path comprises the first location, the first time point, the second location, the second time point, the third location, and the third time point.

29. The method of claim 20, further comprising:
determining an association set of visual attributes between the first mobile device and a second mobile device based on the first image;
detecting the second mobile device at a third location at a third time point using a second proximity recognition device, wherein the first mobile device is not detected at the third location at the third time point; and
determining a device path, wherein the device path comprises the first location, the first time point, the second location, the second time point, the third location, and the third time point.

30. The method of claim 20, further comprising:
determining whether the first mobile device is in a list of known devices; and in response to a determination that the first mobile device is in the list of known devices, retrieving a history of the first mobile device; and
visually display a value of the history of the first mobile device.

31. The method of claim 30, wherein:
the history of the first mobile device comprises a count of a group of people, wherein the first mobile device was determined to have moved within the group of people in a previous visit; and
visually displaying the value of the history of the first mobile device comprises visually displaying the count of the group of people.

32. The method of claim 20, wherein the signal is a wireless local area network signal, IEEE 802.15.1-2002/2005 signal, Active RFID signal, WiMax signal, or Long Term Evolution signal.

33. The method of claim 20, wherein the field of view is a first field of view, and further comprising:
determining a first set of mobile devices detected at the first location, wherein the first set of mobile devices comprises the first mobile device;
determining a second set of mobile devices detected at the second location, wherein the second set of mobile devices comprises the first mobile device; and
determining a third set of mobile devices based on which devices are in both the first set of mobile devices and the second set of mobile devices, wherein the third set of mobile devices comprises the first mobile device.

34. The method of claim 20, wherein:
the first mobile device is one of a plurality of mobile devices;
the signal is one of a first plurality of signals;
the first person is one of a plurality of physically different persons; and
further comprising:
determining that the plurality of mobile devices is present at the first location based on the first plurality of signals received by the proximity recognition device at the first time point;
detecting the plurality of physically different persons depicted in the first image based on the first image, wherein the plurality of physically different persons is determined to be a group;
detecting that the plurality of mobile devices is at the second location based a second set of signals received by a second proximity recognition device at the second time point; and
generating an alert indicating that the group has arrived at the venue.

35. The method of claim 20, further comprising determining the first location based on a trilateration computation, a triangulation computation, or a time of flight computation.

36. The method of claim 20, wherein the first image is associated with a set of values defining the field of view captured by the first image.

37. The method of claim 20, further comprising:
displaying a future time point associated with a future visit of the first mobile device to the venue, wherein the future time point occurs after the first mobile device is determined to have departed from the venue.

38. The method of claim 20, wherein determining that the first mobile device is present at the first location comprises:
changing a signal strength threshold of the proximity recognition device;
determining whether a signal strength of the signal satisfies the signal strength threshold; and in response to a determination that the signal strength satisfies the signal strength threshold, determine the first mobile device is present at the first location.

* * * * *